United States Patent [19]

Yamada et al.

[11] Patent Number: 5,793,017
[45] Date of Patent: Aug. 11, 1998

[54] APPARATUS FOR AUTOMATICALLY WELDING TUBULAR COMPONENTS OF FUSIBLE RESIN AND PIPE CLAMPING APPARATUS AND HEATING APPARATUS USED FOR THE SAME

[75] Inventors: Nagamasa Yamada, Fujisawa; Kaoru Onizuka, Turugashima, both of Japan

[73] Assignee: N.G.N. Co. Ltd., Saitama, Japan

[21] Appl. No.: 566,016

[22] Filed: Dec. 1, 1995

[30] Foreign Application Priority Data

| Dec. 5, 1994 | [JP] | Japan | 6-329248 |
| Dec. 5, 1994 | [JP] | Japan | 6-329249 |
| Dec. 5, 1994 | [JP] | Japan | 6-329251 |
| Jun. 8, 1995 | [JP] | Japan | 7-164542 |
| Aug. 18, 1995 | [JP] | Japan | 7-232046 |

[51] Int. Cl.$^6$ .............. H05B 3/00; B29L 23/00; F16B 1/00
[52] U.S. Cl. .............. 219/221; 219/521; 392/418; 156/304.2; 156/304.6
[58] Field of Search .............. 219/221, 521, 219/544; 392/407, 418, 432; 156/304.2, 604.6, 380.9, 510, 516, 523

[56] References Cited

U.S. PATENT DOCUMENTS

| 3,391,045 | 7/1968 | Mojonnier et al. | 156/304.2 |
| 3,897,296 | 7/1975 | Waldrum | 156/304.2 |
| 4,909,892 | 3/1990 | Quinn et al. | 156/304.6 |
| 4,995,935 | 2/1991 | Ganzberger | 156/304.2 |
| 5,241,157 | 8/1993 | Wermelinger et al. | 156/304.2 |
| 5,444,814 | 8/1995 | Hofius, Sr. | 156/380.9 |
| 5,527,406 | 6/1996 | Brath | 156/304.2 |
| 5,599,419 | 2/1997 | Hunter et al. | 156/304.6 |

FOREIGN PATENT DOCUMENTS

| 63-104824 | 5/1985 | Japan . |
| 3-92335 | 4/1991 | Japan . |
| 3-43054 | 7/1991 | Japan . |
| 4-229231 | 5/1992 | Japan . |

*Primary Examiner*—John A. Jeffrey
*Attorney, Agent, or Firm*—Ostrager, Chong & Flaherty

[57] ABSTRACT

An apparatus for automatically a pair of welding tubular components made of a thermally fusible resin by abutting them to each other, includes a pair of clamp units for holding the pair of tubular components, an abut portion on which the end face of each of the tubular component abuts when the pair of the tubular components are held by the pair of clamp units, a cutting unit for cutting respective end faces of the pair of the tubular components held by the pair of the clamp units so that the cut end faces are normal to the axis of the pipes, and a fusing unit for fusing opposing end faces of the pipes which are cut by the cutting unit, to an equal fusing depth. The cutting unit, the abut portion and the fusing unit are spacedly disposed on a rotary disc in an angular moving direction. One of the tubular components is moved toward the other of the tubular components which are fused by said fusing unit for welding them to each other.

7 Claims, 28 Drawing Sheets

Correlation Between the Temperatures of The Ceramic

——— Ceramic Layer
--- Tungsten Heater

Absorptive Spectra of PFA

Absorptive Spectra of PPS

A : $Al_2O_3$
B : $SiO_2$
C : $2MgO \cdot 2Al_2O_3 \cdot 5SiO_2$

APPARATUS FOR AUTOMATICALLY WELDING TUBULAR COMPONENTS OF FUSIBLE RESIN AND PIPE CLAMPING APPARATUS AND HEATING APPARATUS USED FOR THE SAME

BACKGROUND OF THE INVENTION

1. Field of the Invention

The present invention relates to an apparatus for automatically abut-welding tubular components made of a thermally fusible resin and in particular to an apparatus for automatically welding tubular pipes made of a thermally fusible resin such as fluorine resins and super engineering plastics.

The present invention also relates to a pipe clamping apparatus and a heating apparatus used for the above-mentioned automatic welding apparatus.

2. Description of Related Art

Recently, needs for high quality resins have been increased in the field of pharmaceutical, food, semiconductor, biotechnological, chemical and housing and gas production industries in view of chemical resistance and safety to environment.

Fluorine resins such as perfluoroalcoxy and polyvinylidenefluoride and super engineering plastics such as polyphenylene sulfide and polyether ketone has been used as piping materials.

Piping is generally conducted by flaring the end faces of pipes and connecting the pipes with flange connections or fittings (coupling).

FIG. 30 is a longitudinal sectional view explaining a conventional pipe connecting method by flaring.

In the illustrated connecting method, one end of a plastic pipe P to be connected is flared to increase its diameter. The flared portion is adapted upon another pipe 70 with which the pipe 60 is to be connected. A blind nut 72 is adapted upon the outer periphery of the flared portion. Both pipes are connected by tightly screwing the internal threads 72a of the blind nut 72 upon the outer threads 70a of the pipe 70.

However, in this connecting method, the flared portion is liable to be inclined with respect to the axis of the pipe if the end face of the plastic pipe P is not normal to the axis thereof. There is the risk of liquid leakage from a space between the flared portion and the pipe to be connected if the flared portion is inclined with respect to the axis of the plastic pipe P.

The connecting method using fitting has the other problems such as high cost for manufacturing and mounting of the fitting, the risk of liquid leakage and difficulty to keep clean environment.

In order to overcome the foregoing problems, the connecting method which relies upon welding of piping made of thermoplastic resin has attracted attention. Various welding apparatus have been developed.

An apparatus for abut-welding plastic tubular components which is disclosed in the specification of JP-A-4-229231 comprises a jaw unit for holding the components in an axial direction thereof, and a unit for heating the ends of the components with thermal rays under non-contact condition. The heating unit includes a heating element of a metal plate coated with a ceramic coating layer, which is electrically heated.

A welding apparatus which is disclosed in the specification JP-A-3-92335 comprises a support sleeve disposed on the outer periphery of a tubular member made of a thermoplastic material and a support unit disposed within the tubular member. The welding apparatus further includes a heating unit for fusing the thermoplastic material which forms the tubular member which is surrounded by the support sleeve and the support unit. The heating unit includes at least one first infrared heat source and the support sleeve is made of an infrared ray transmittable material.

It is taught in the specification that the heating unit may be of the type in which an electric heating wire is covered with ceramic material and the outer ceramic material is heated to radiate thermal rays or may be a quartz heater in which electrically heated wire is embedded in the vicinity of the surface thereof.

Other welding apparatus are also disclosed in the specifications of JP-A-3-43054, JP-A-63-104824.

The above-mentioned conventional welding apparatus have various drawbacks in that work pieces should be independently worked and the heater temperature, environmental temperature and material characteristics should be accurately controlled to provide a proper fusing condition.

A known apparatus disclosed in JP-A-4-229231 has a drawback in which an extended period of time is taken until the ceramic layers are substantially uniformly heated since the heating unit comprises the heating element of a electrically heated metal plate is covered with the ceramic coating layer. A space between the heating unit and the plastic tubular components should be wider since there are slight variations in temperature on the ceramic coating layer. Therefore, it is necessary to elevate the surface temperature of the ceramic coating layer to a high temperature (for example, not less than 1100° C.).

The heating unit of the type in which the electrically heated wire is covered with the ceramic material, in the heating units disclosed in JP-A-3-92335 has the same drawback as that of the unit disclosed in JP-A-4-229231. Contact of the quartz heater having the electrically heated wire in the surface thereof with the end face of the plastic tubular component during heating can not be completely eliminated, resulting in pollution of the end face. This is serious drawback in case where the plastic tubular components for which the welding apparatus is used in the field of pharmaceutical, food, semiconductor, biotechnological and chemical industries.

The heating unit which is disclosed in the specification of JP-A-4-229231 includes a heating element of an electrically heatable metal plate which is covered with a ceramic coating layer. The ceramic layer is provided for uniformly radiating thermal energy in association with the lower metal plate having an excellent thermal conductivity.

Therefore, the cited reference does not teach that the difference in absorption spectrum due to differences in material for the tubular components of resin to be connected can be advantageously used and that a material which is capable of radiating far infrared rays including rays falling in a wave length range in which the absorption rate is higher in the absorption spectrum. The heating unit of the above-mentioned JPA-4-229231 is unable to heat the components at lower temperatures, and thus the energy consumption is high.

The jaw unit holds a pair of confronting pipes by sandwiching the pipes in downward and upward directions in two positions separated in an axial direction (refer to FIG. 2 in the cited reference). Although such a conventional jaw unit can hold an I-shaped pipe, there is the risk of misalignment when the pipe end face is cut since T- or L-shaped pipe is held in a cantilever manner.

The present invention was made to overcome the above-mentioned problems of the related art.

It is therefore an object of the present invention to provide an apparatus for automatically welding tubular components made of a thermally fusible resin in which all steps for abut-welding the opposing pipes, such as, abutting, fixing, cutting, fusing, connecting and cooling steps are conducted in a continuous and smooth manner without requiring any sophisticated experience.

It is another object of the present invention to provide a pipe clamp apparatus which is capable of positively clamping various type pipes which are being welded.

It is a further object of the present invention to provide a heating apparatus which is capable of fusing the end faces of the pipes within a shortened period of time at a low temperature with less energy consumption.

It is a further object of the present invention to provide a heating unit for fusing the tubular components while the heating unit is not in contact therewith.

SUMMARY OF THE INVENTION

In a first aspect of the present invention, there is provided an apparatus for automatically welding tubular components which form a pair and is made of a thermally fusible resin by abutting them each other, comprising:

- a pair of clamp units for holding the pair of tubular components;
- an abut portion on which the end face of each of the tubular component abuts when the pair of the tubular components are held by the pair of clamp units;
- a cutting unit for cutting respective end faces of the pair of the tubular components which are held by the pair of the clamp units;
- a fusing units for fusing opposing end faces of the pipes which are cut by the cutting unit, to an equal fusing depth;
- a rotary disc on which said cutting unit, said abut portion and said fusing unit are spacedly disposed in an angular moving direction, said rotary disc being indexed to drive; and
- drive means for moving one of the tubular components which are fused by said fusing unit toward the other of the tubular components which are fused by said fusing unit for welding them to each other.

In a preferred embodiment of the first aspect of the present invention, said cutting unit is arranged to cut the respective end edge of the pair of the tubular components so that they are tapered from the inner wall to the outer peripheral edge in cross section.

In another preferred embodiment, said fusing unit comprises a radiator made of a material which is capable of radiating at a high emissivity far infrared rays including those falling in a range of wave length in which the absorption rate is higher among the absorption spectrum of the tubular components to be connected and a heater for heating said radiator to radiate predetermined far infrared rays therefrom.

Preferably, said fusing unit is adapted to be preliminarily heated prior to being inserted into a space between the tubular components and after it has been preliminarily heated to a given temperature, the power supply to said fusing unit is stopped and it is inserted into a space between the tubular components.

In a further preferred embodiment, said fusing unit comprises a pair of glass plates through which infrared rays are transmittable and a heater element which is sandwiched between the glass plates.

In a further preferred embodiment, said fusing unit is driven to move in a plane normal to the axis of the said tubular components into a space therebetween during heating, whereby the tubular components are fused from their end faces to an equal depth.

In a further preferred embodiment, each of the clamp units is adapted to secure respective tubular component in two positions.

In a second aspect of the present invention, there is provided an apparatus for detachably clamping an I-, T-, L- and cross-shaped pipe, comprising:

- a base having, on its upper face, pipe bearing recesses, two of which are aligned with the axis of the pipe and at least one recess being positioned on a line normal to the axis; and
- a member having, on its lower face, pipe holding recess for detachably holding the pipe around the outer periphery thereof in complementary with at least one pipe bearing recess of said base.

As a variant, the pipe clamping apparatus comprises:

- pipe bearing recesses each having semicircular section which are formed in two positions aligned with the axis of the pipe and in other two positions aligned with a line normal to the axis, and stop means; and
- pair pipe holding arms which are pivotally mounted at one end thereof on said base and has at the other end thereof engaging means engaged with the stop means so that it is detachably secured to said base.

In a third aspect of the present invention, there is provided a heating apparatus for welding tubular components to each other by opposing the tabular components to be connected which form a pair and heating the opposing end faces of the pipes for fusing them and thereafter moving the pipes toward each other, comprising:

- a radiator made of a material which is capable of radiating at a high emissivity far infrared rays including these falling in a wave length range in which the absorption rate is relatively higher in the absorption spectrum of said tubular components to be connected;
- a heater for heating said radiator to cause it to radiate predetermined far infrared rays therefrom, whereby to irradiate the pair of the tubular components of resin with substantially equal amount of thermal energy.

In a preferred embodiment of the third aspect of the present invention, said tubular pipes are made of fluorine resins such as polytetrafluoroethylene (PTFE), fluoroethylenepolymer (FEP), perfluoroalcoxy (PFA), ethylenetetrafluoroethylene (ETFE), chlorotetrafluoroethylene (CTFE), polyvinylidenefluoride (PVDF) and high grade engineering plastics such as polypropylene sulfide (PPS) and in which said radiator comprises thin layers made of ceramics.

In another preferred embodiment, said heater is adapted to heat the surface of said radiator for elevating its temperature to 250° C. to less than 580° C.

In a further preferred embodiment, said pipes are made of PFA or PVDF and in which said radiator is made of a material which is capable of radiating far infrared rays at an emissivity of not less than 0.5, preferably not less than 0.6 in a wave length range of 6–10 μm in which the absorption rate is relatively higher in the absorption spectrum of PFA or PVDF or alternatively said pipes are made of PPS and in which said radiator is made of a material which is capable of radiating far infrared rays at an emissivity of not less than 0.5, in wave length ranges of 2.5 to 3.5 μm and 6 to 13 μm in which the absorption rate is relatively higher in the absorption spectrum of PPS.

In a fourth aspect of the present invention, there is provided a heating apparatus for welding tubular components to each other by opposing the tabular components made of a resin to be connected which form a pair and heating the opposing end faces of the pipes for fusing them and thereafter moving the pipes toward each other, comprising:

first and second flat infrared transmittable glass plates;

an heater element between said both glass plates, which can be electrically heated; and a raised portion made of a glass material fusible to said glass plate, which surrounds at least said heater element and is raised slightly higher than the level of the heater element; whereby substantially equal amounts of energy are symmetrically radiated.

In a preferred embodiment of the fourth aspect of the present invention, means for scattering thermal rays emitted from the heating element are provided on the surfaces of said first and second flat infrared ray transmittable glass plates.

DETAILED DESCRIPTION OF PREFERRED EMBODIMENTS

Figure 1:
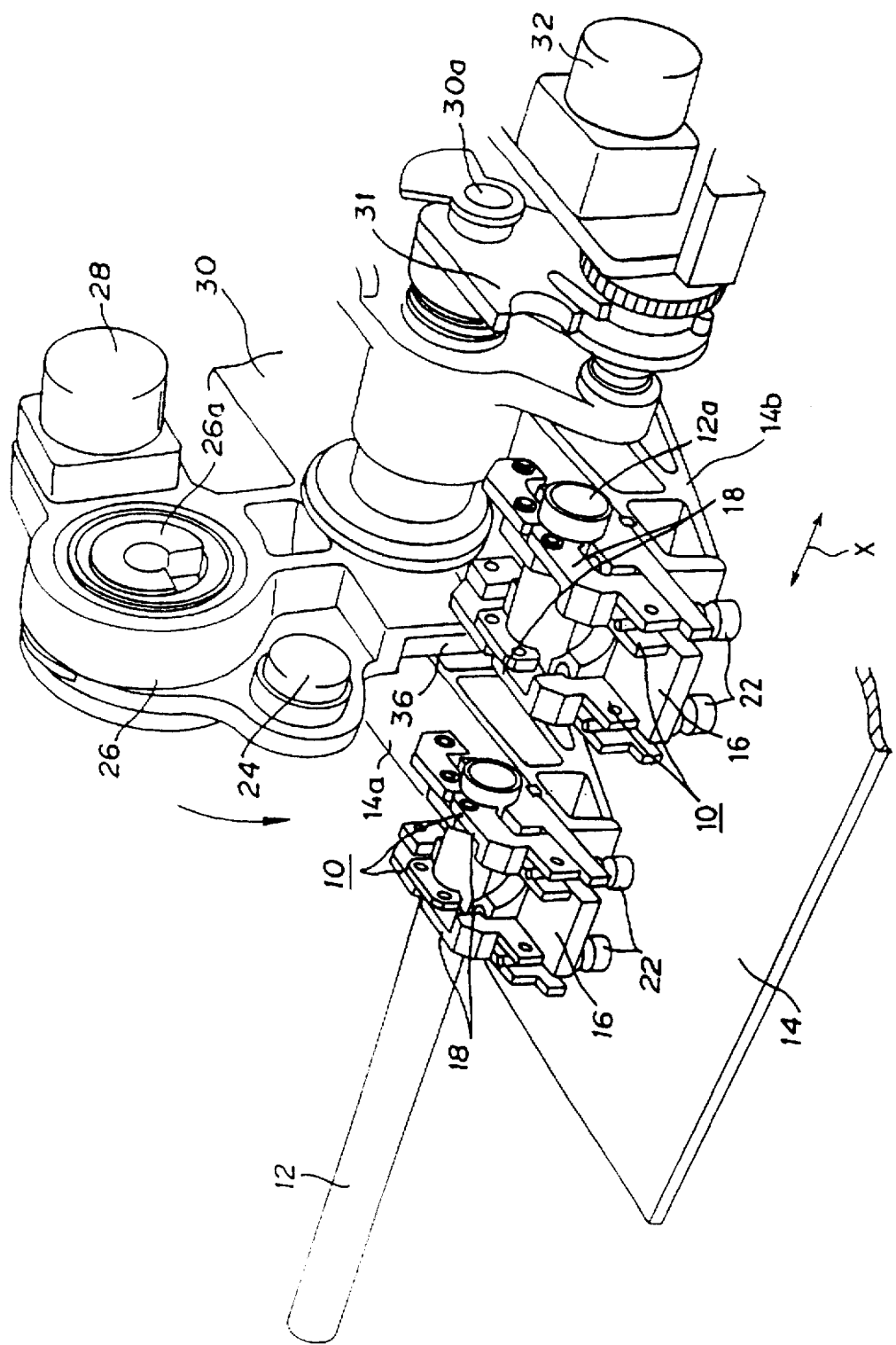
FIG. 1 is a schematic perspective view showing an essential portion of an apparatus for automatically welding pipes made of a thermally fusible resin of the present invention.
Figure 2:
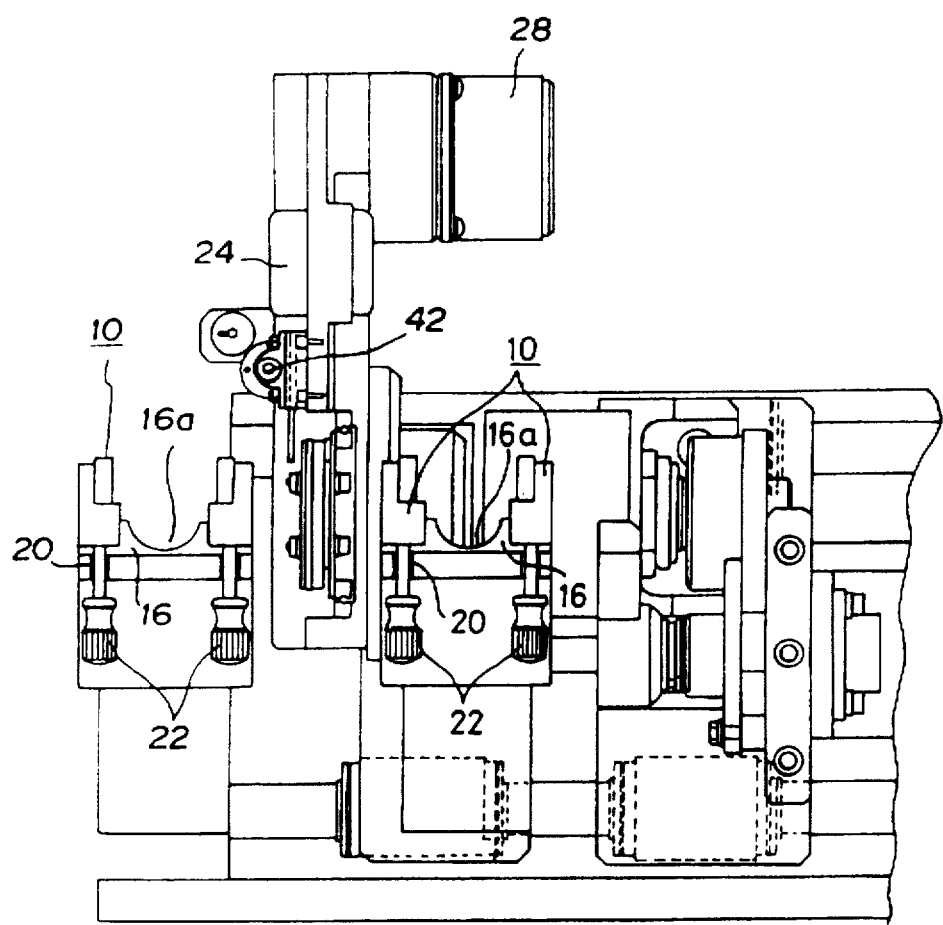
FIG. 2 is a front view of the apparatus shown in FIG. 1.

Now, preferred embodiment of an apparatus for automatically welding tubular components made of a fusable resin of the present invention will be described with reference to FIGS. 1 through 13.

Referring now to FIGS. 1 to 4, there are shown the schematic perspective, front, left elevational and right elevational views showing the apparatus for automatically welding the fusible tubular components of resin of the present invention, respectively.

The automatic welding apparatus of the present invention comprises a pair of clamp units (refer to FIGS. 5 to 7) for clamping a pair of opposing pipes 12, 12a (hereinafter referred to pipes) made of a thermally fusible thermoplastic resin; a cutting unit 26 (refer to FIGS. 9 and 10) for cutting the respective end faces of a pair of pipes 12, 12a which are clamped by the pair of clamp units 10, 10 so that the cut end faces become fat which is normal to the axes of the pipes or they are bevelled at the inner peripheral edges so that they are tapered from the inner walls of the pipes to the outer peripheral edges, fusing unit 36 (FIGS. 12 and 13) for fusing the end faces which are cut by the cutting unit 26; and a driving unit (not shown) for moving one of the fused pipe toward the other pipe for welding.

The clamping units have identical structures as follows:

One of the clamp unit 10 (stationary clamp unit) is mounted on a support arm 14a which is secured to a body 14 and the other clamp unit 10 (movable clamp unit) is mounted on a support arm 14b which is in turn mounted on the body 14 which is reciprocal in a direction of an arrow X thereto. Accordingly, the pair of the pipes 12, 12a which is held by the clamp units 10 are relatively moved toward and away from each other.

Figure 5:
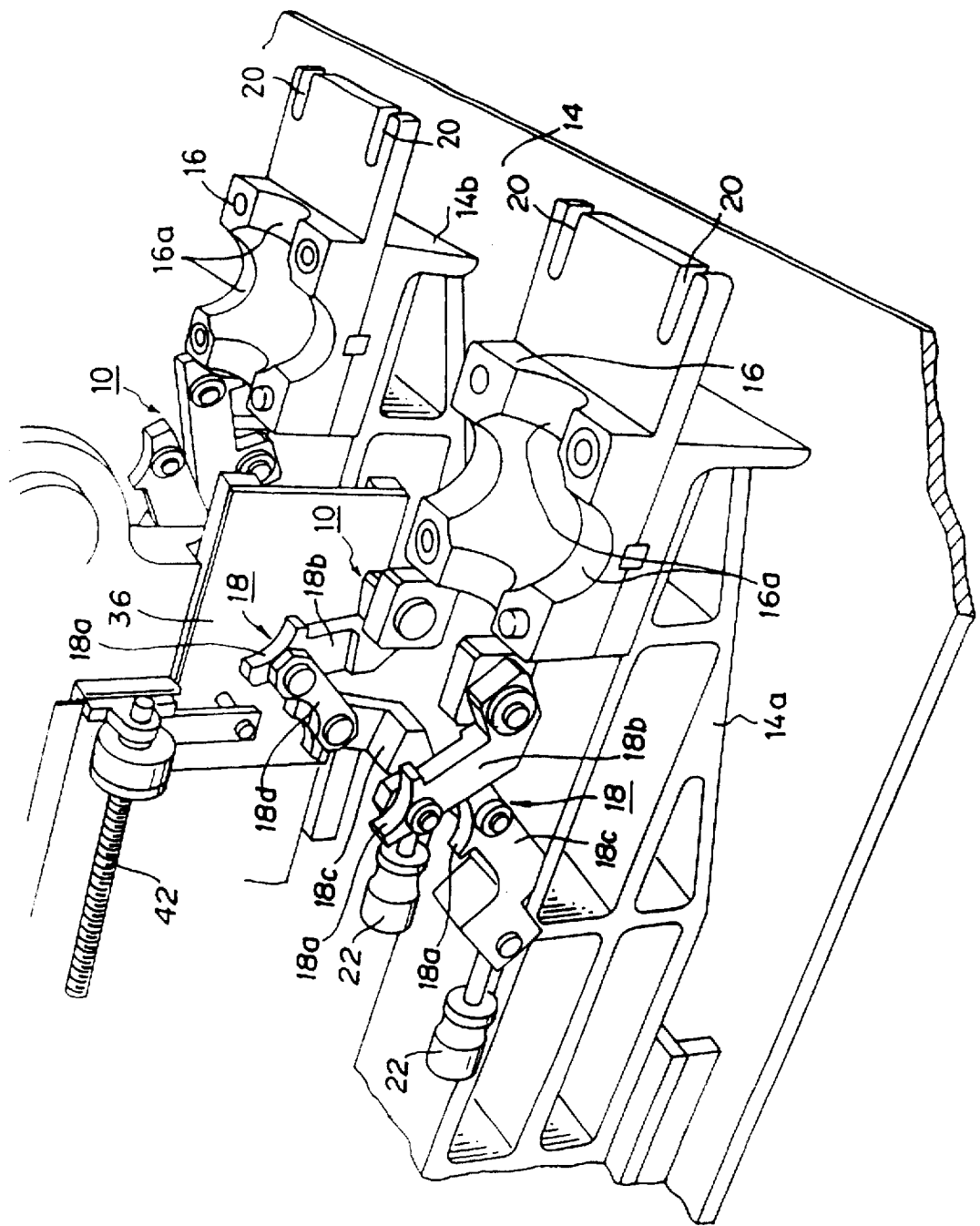
FIG. 5 is a perspective view showing a clamp unit of the apparatus shown in FIG. 1.

As best shown in FIG. 5, each of the clamp units 10 includes rectangular base having total four pipe bearing recesses each having substantially semicircular section, a pair of the recesses being aligned in the axial direction and another pair of the recesses being aligned in a direction perpendicular to the axial direction.

A pair of pipe molding arms 18 is mounted on the base 16. A pipe holding recess 18a is provided below each pipe holding arm 18a, which is capable of holding a pipe around the entire periphery thereof in complimentary with one of the axially aligned pipe bearing recesses 16a on the base 16.

Each pipe holding arm 18 is pivotally mounted on the base 16 at one end thereof and is detachably secured at the other end thereof on the base 16 by means of set screw 22 engaged with notches 20 formed in the base 16.

The pipe holding arm 18 comprises three arms 18b, 18c and 18d. The two arms 18b and 18c are pivotally linked at opposing ends thereof to a link arm 18d.

The various pipes can be positively and stably held by such a clamp unit 10 since I- or cross-shaped pipe is clamped in two positions and T- or L-shaped pipe is clamped in one position and is supported on the pipe bearing recess 16a of the base in one or more positions. Accordingly, the pipes are prevented from being misaligned to each other since they are positively held when the respective end faces of the pipes are cut by the cutting unit 26.

Although each of the pipes 12, 12a is clamped by two arms 18 for each clamp unit in the afore-mentioned embodiment, it may be clamped by one or three arms if needed.

The rectangular base 18 having cross-arranged pipe bearing recesses 16a which is fixed on the body 14 may be replaced with a suitable another base having different size (for example, ½ to 1 inch) depending upon the diameter of the used pipes 12, 12a.

Figure 6:
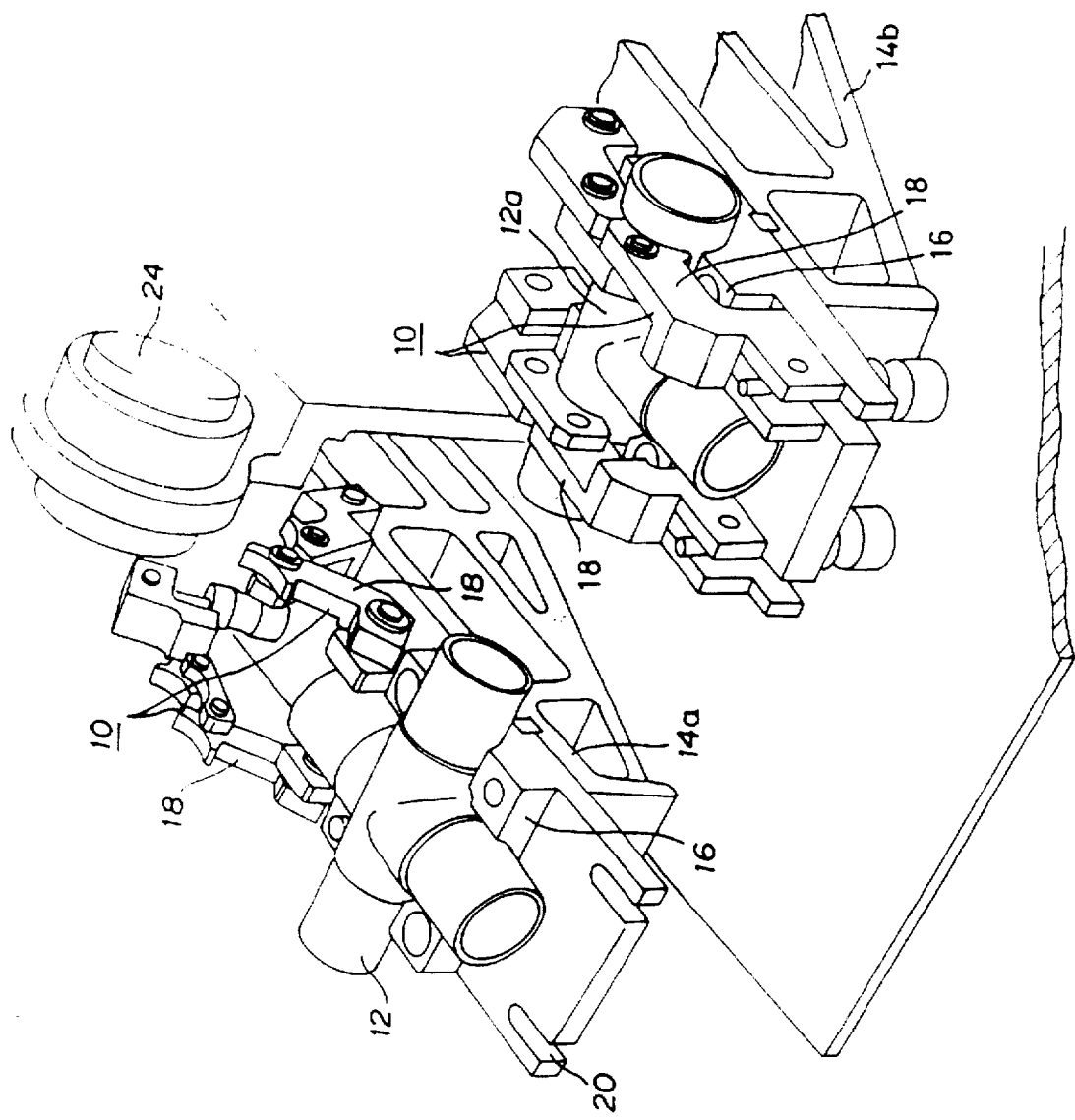
FIG. 6 is a perspective view showing an example of use of the clamp unit.
Figure 7:
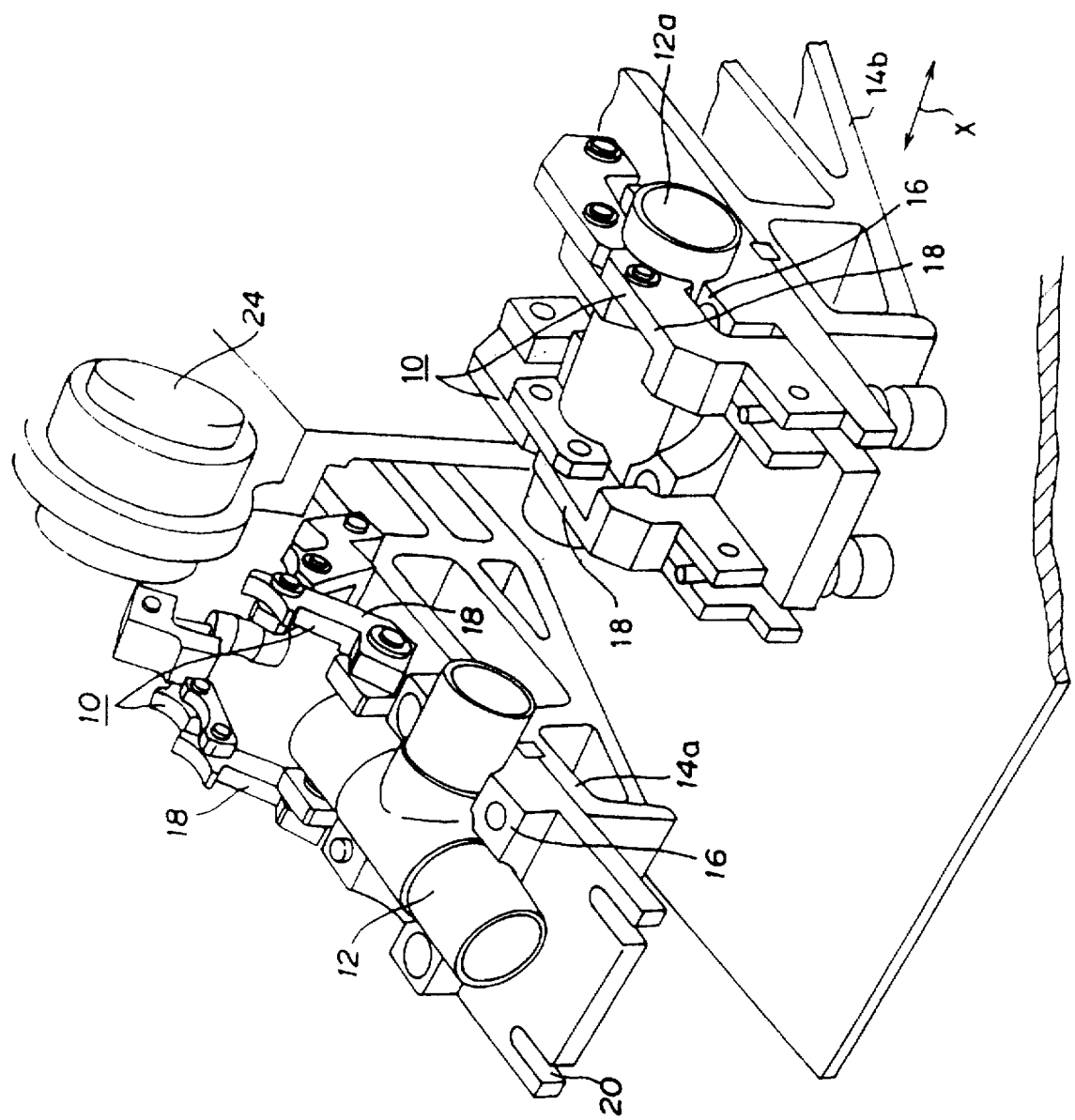
FIG. 7 is a perspective view showing another example of use of the clamp unit.
Figure 8:
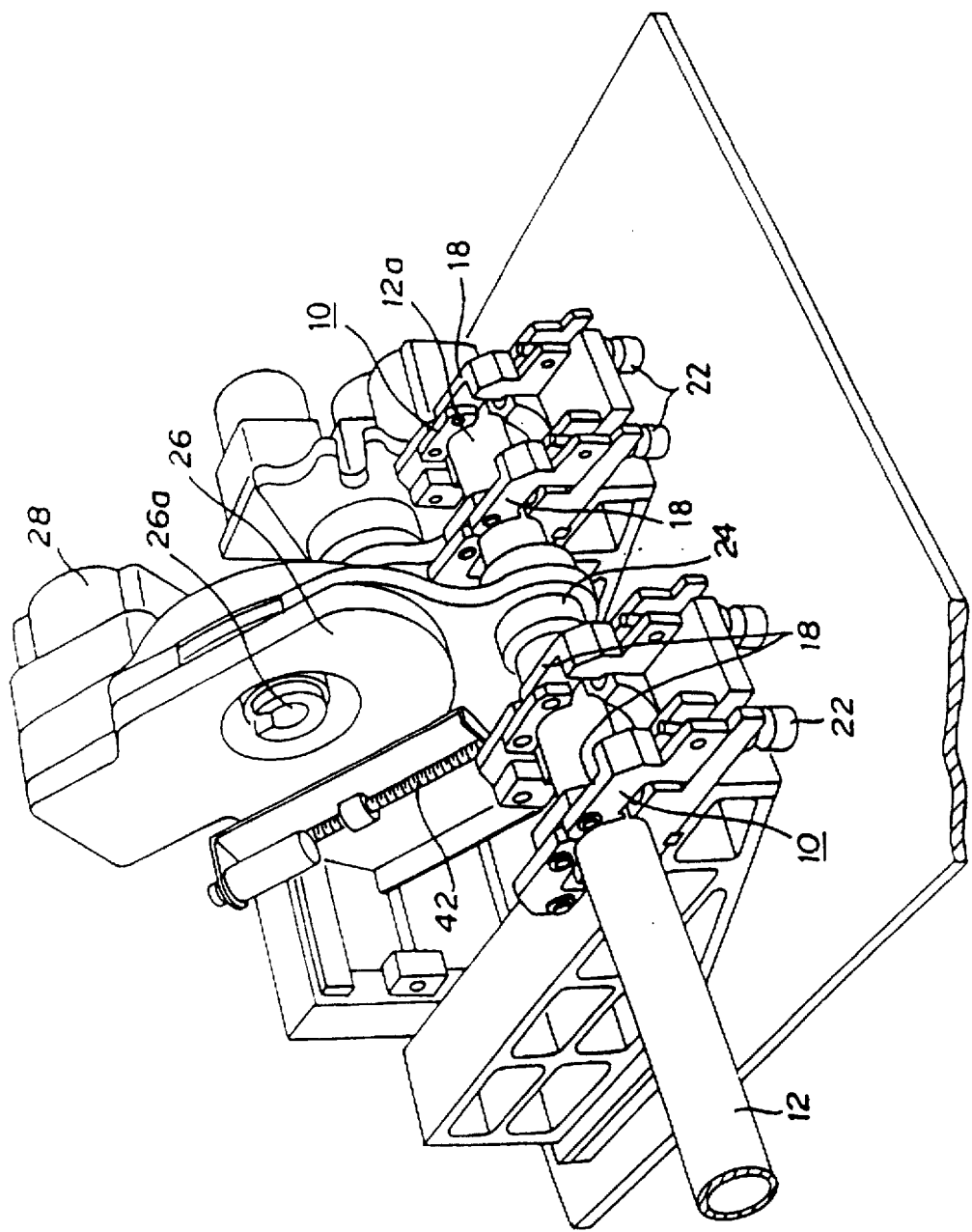
FIG. 8 is a perspective view showing an abut portion of the apparatus of the present invention.
Figure 9:
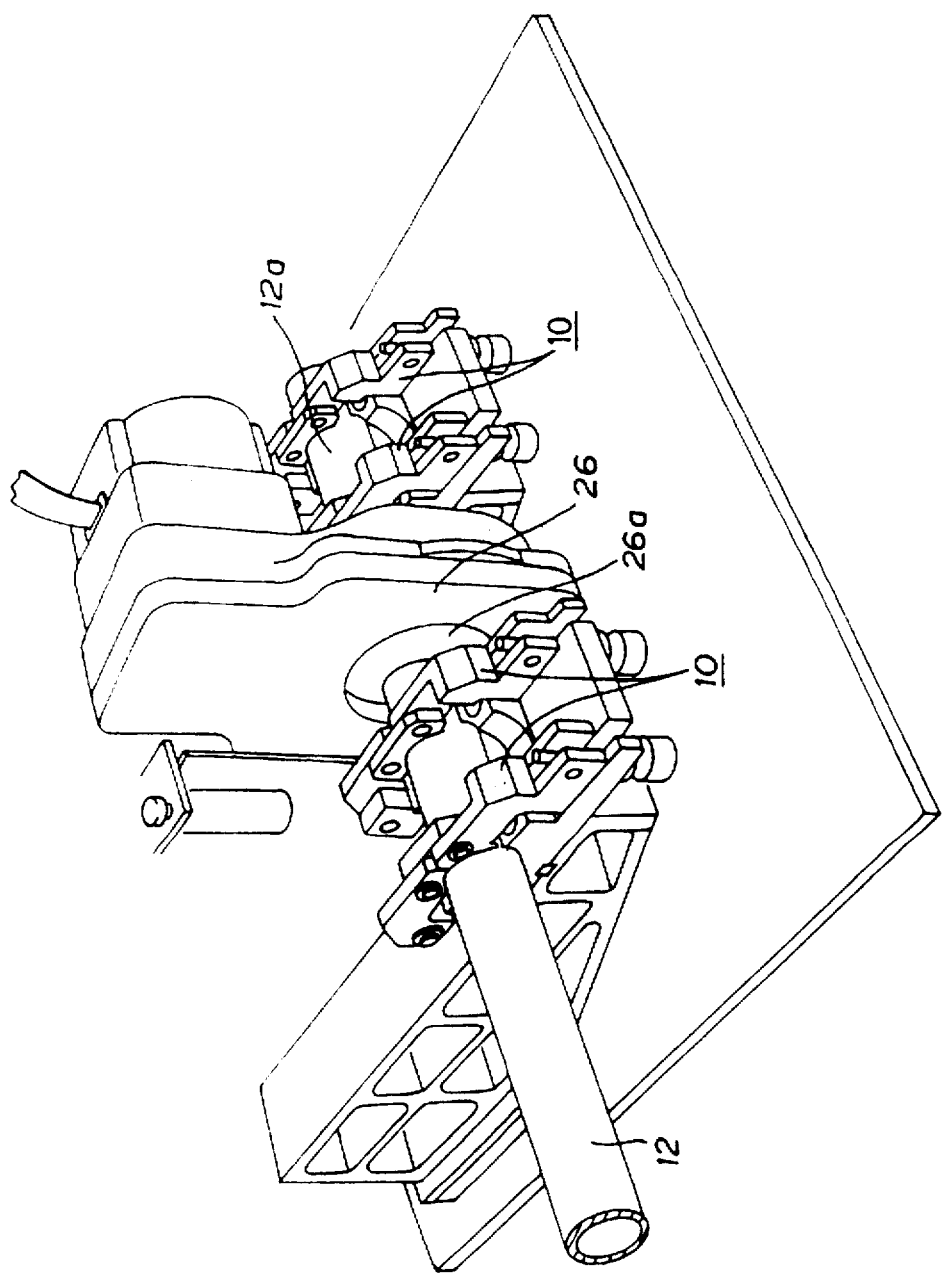
FIG. 9 is a perspective view as viewed from the left side showing a cutting unit of the apparatus in FIG. 1.
Figure 10:
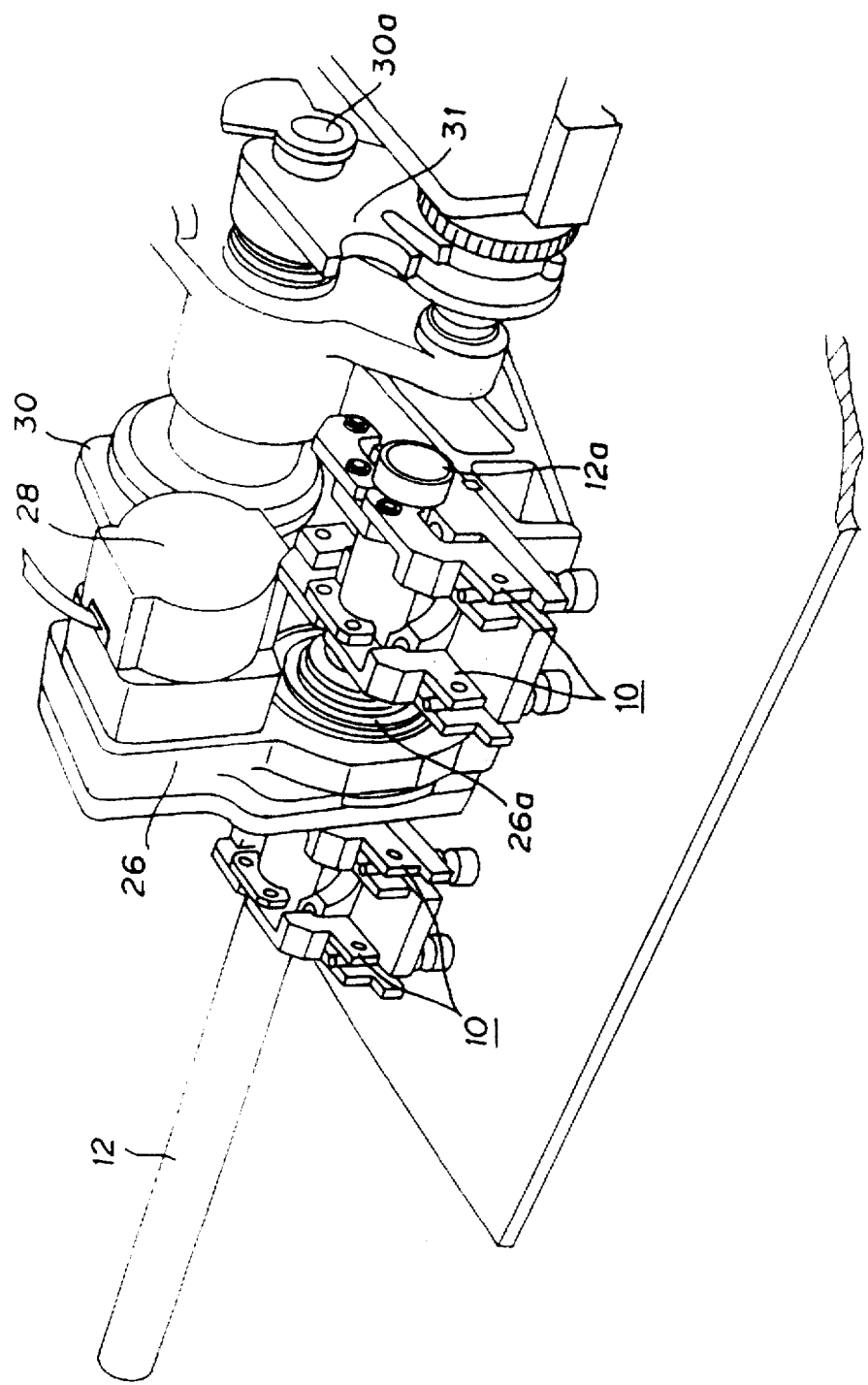
FIG. 10 is a perspective view as viewed from the right side showing the cutting unit.
Figure 11:
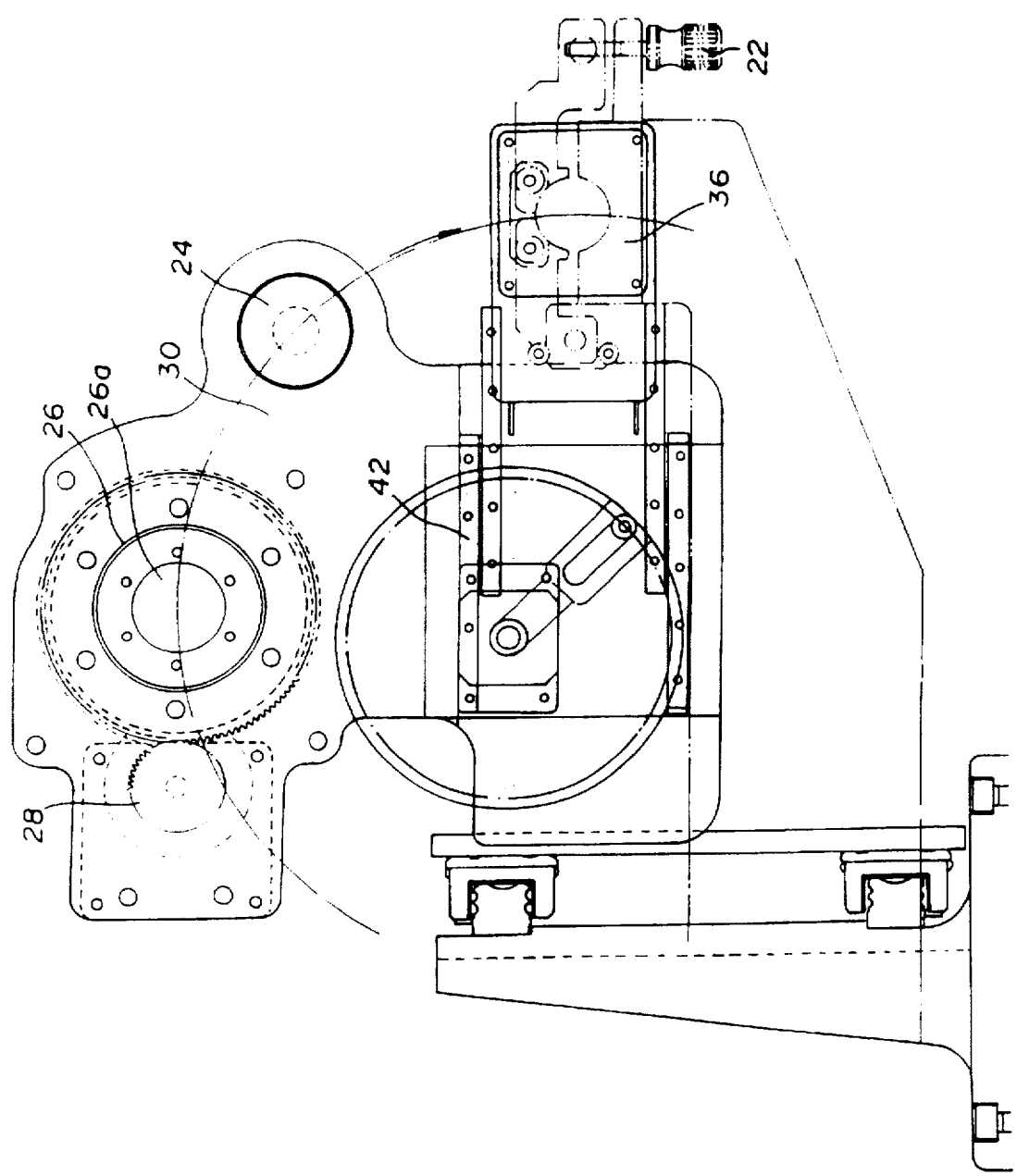
FIG. 11 is an left elevational view showing the cutting unit.

Since the pipe bearing recesses 16a are disposed in a cross manner on the upper face of the base 16 in the foregoing embodiment, I-shaped (long or short) pipe as well as T- or cross-shaped coupling pipes as shown in FIGS. 6 and 7 may be used as pipes 12, 12a. Although not shown, L-shaped coupling pipe may be used.

Figure 19:
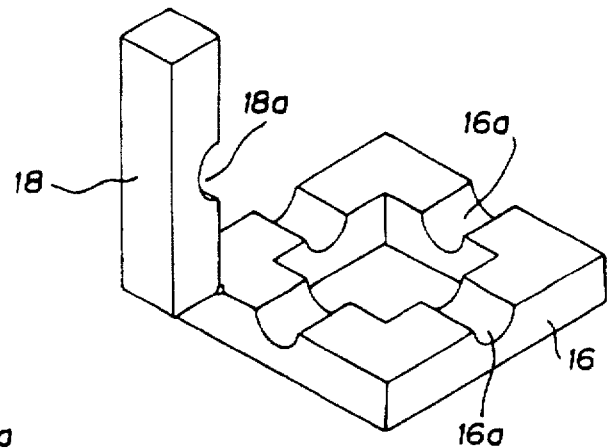
FIGS. 19(a), (b) and (c) are schematic perspective views showing various embodiments of the essential part of the pipe clamp unit which is in a second aspect of the present invention.
Figure 19:
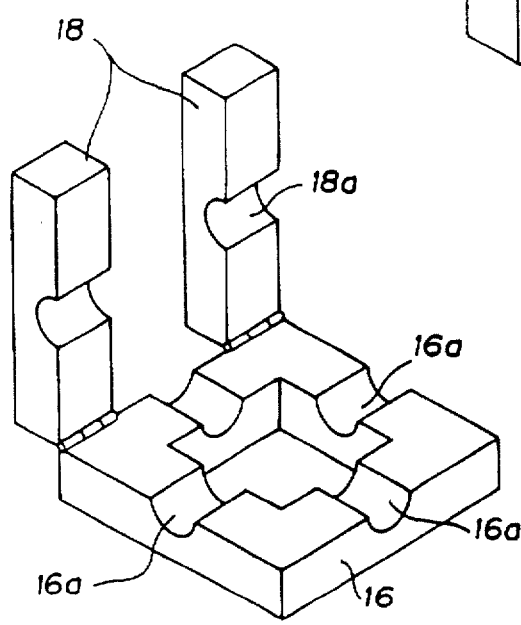
Figure 19:
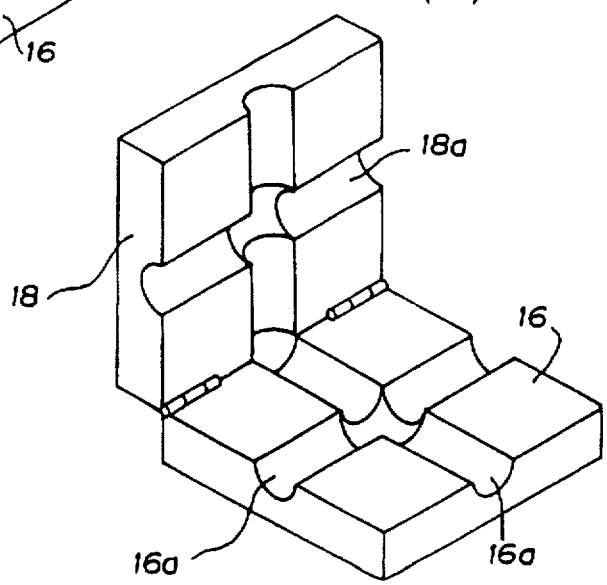

Referring now to FIGS. 19(a) through 19(b), there are shown schematic perspective views of various embodiments of the essential part of the pipe clamp unit of the present invention.

The clamp unit of FIG. 19(a) comprises a rectangular base 16 having, on its upper face, pipe bearing recesses 16a each having substantially semicircular section, two recesses being aligned in an axial direction and one recess being formed in one position on a line to the axial direction; and one pipe holding arm 18 which may be detachably secured on the upper face of the base 16, the arm 18 having on its lower face a pipe holding recess 18a which is capable of holding the pipe 12, 12a on the entire periphery thereof in complementary with one of the pipe bearing recess 16a of the base 16.

By means of this clamp unit, I-, T- and L-shaped coupling pipe can be held.

The clamp unit in FIG. 19(b) comprises a rectangular base 16 having, on its upper face, pipe bearing recesses 16a each having substantially semicircular section, two recesses being aligned in an axial direction and two recesses being formed in one position on a line perpendicular to the axial direction; and two pipe holding arm 18 which may be detachably secured on the upper face of the base 16, the arm 18 having on its lower face a pipe holding recess 18a which is capable of holding the pipe 12, 12a on the entire periphery thereof in complementary with one of the pipe hearing recess 16a of the base 16.

By means of this clamp unit, I-, T- and L-shaped coupling pipe can be held.

The clamp unit of FIG. 19(c) comprises a rectangular base 16 having, on its upper face, pipe bearing recesses 16a each having substantially semicircular section, two recesses being aligned in an axial direction and two recesses being formed in one position on a line perpendicular to the axial direction; and one pipe holding arm 18 which may be detachably secured on the upper face of the base 16, the arm 18 having on its lower face a cross-shaped pipe holding recess 18a which is capable of holding the pipe 12, 12a on the entire periphery thereof in complementary with one of the pipe hearing recess 16a of the base 16.

By means of this clamp unit, I-, T- and L-shaped coupling pipe can be held.

The pipe clamp unit which is a second aspect of the present invention can detachably and positively clamp the I-, T-, L or cross-shaped pipe to be abut welded in two clamping positions or alternatively can clamp the pipe in one clamping position and support the pipe on one pipe bearing recess without causing any misalignment so that welding can be achieved without causing any alignment in an axial direction.

Figure 15:
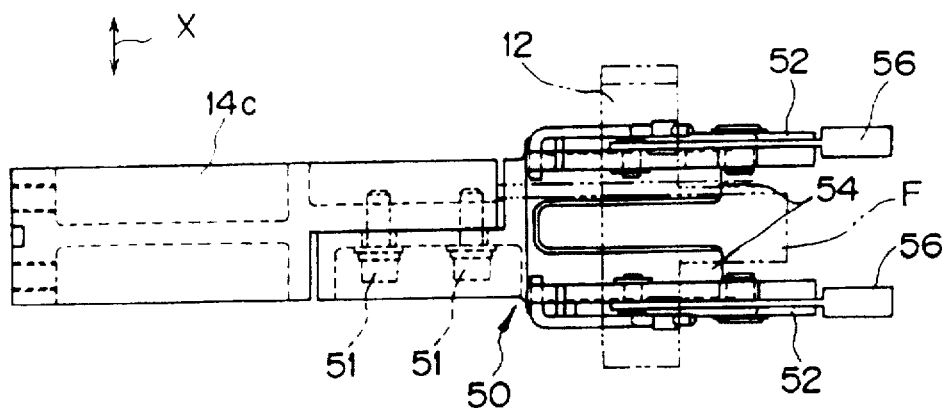
FIG. 15 is a plan view showing another embodiment of a clamp portion which is used for the automatic welding apparatus of the present invention.
Figure 16:
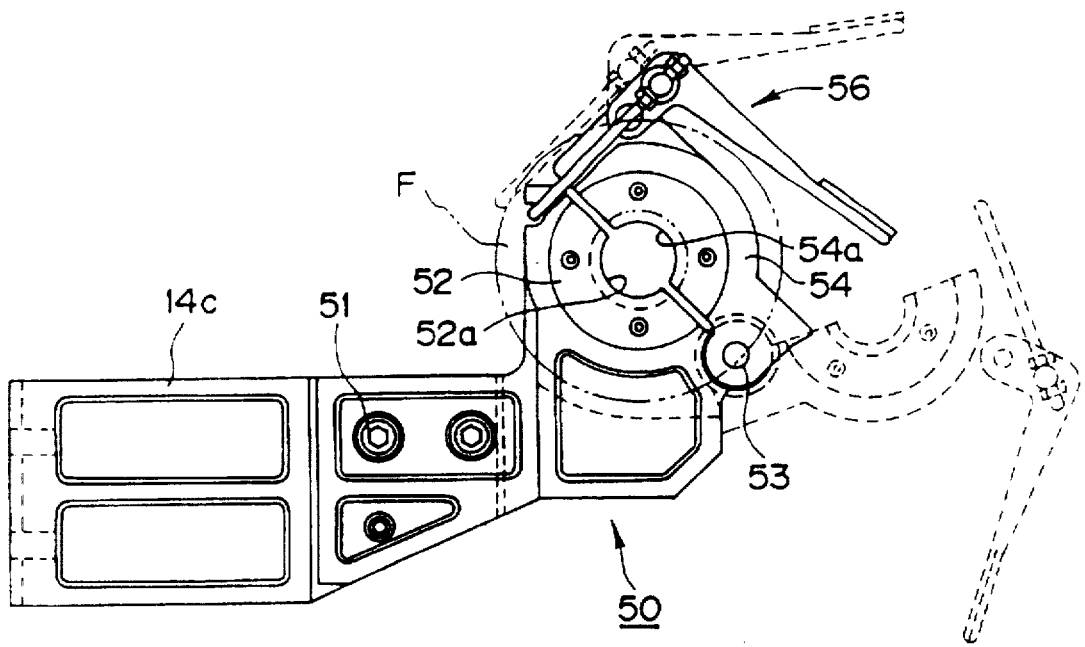
FIG. 16 is a front view showing the clamp unit shown in Fig. 15.

Referring now to FIGS. 15 and 16, there is shown another embodiment of the clamp unit which is used for the automatic welding apparatus of the present invention. The clamp units 50 which forms a pair sandwich the pipes 12, 12a therebetween and have identical structures.

By means of bolts 51, each clamp unit 60 is detachably secured to a support arm 14c which is fixed to the body 14 or reciprocal thereto in a direction of an arrow X. The clamp unit 50 includes pipe bearing 62 which are provided in parallel to each other. Each pipe bearing 52 has a half-arcuate bearing face 52a on which the outer periphery of the pipe 12, 12a is borne. A clamp member 54 is pivotally mounted on the pipe bearing 52 via a hinge shaft 53. A half-arcuate holding face 54a is provided on the face of the clamp member 43 opposite to the pipe bearing 52. The pipe 12, 12a on the entire outer periphery thereof is held by the half-arcuate bearing face 52a and the half-arcuate holding face 54a. The pipe bearing 52 and the clamp member 54 are fastened by a fastening member 56.

In the aforementioned embodiment, the pipe 12 is clamped in two positions by the clamp unit 50, it is firmly secured during cutting of the end face of the pipe 12. An advantage in that completely flat end face can be finished. Since a space is formed between a pair of pipe bearings and the clamp member 51, there is provided an advantage in that the pipe 12, 12a having a flange F can also be clamped. More than one kinds of clamp units 50 which conform with the outer diameter of the pipe 12, 12a may be provided and replaced if needed. This makes it possible to easily replace the clamp units 50 without time-consuming adjustment such as alignment for pipes having different diameters.

Figure 17:
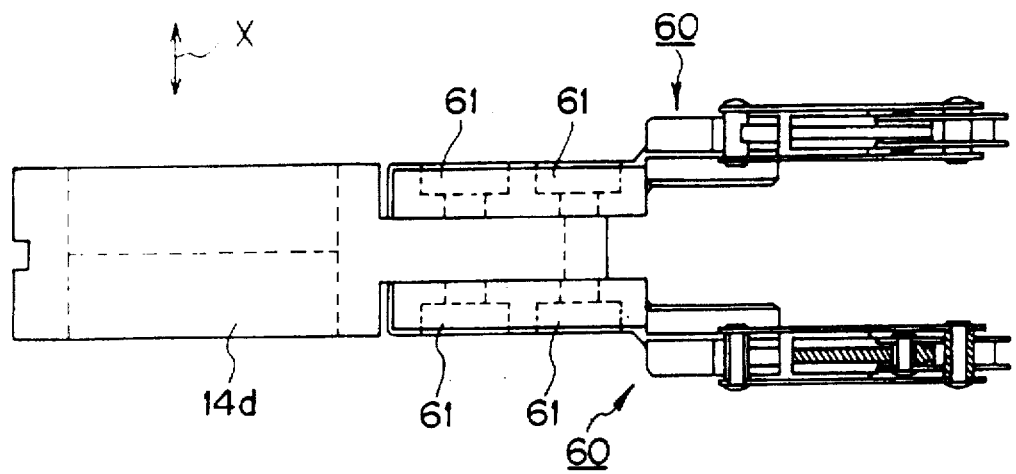
FIG. 17 is a plan view showing a further embodiment of the automatic welding apparatus of the present invention.
Figure 18:
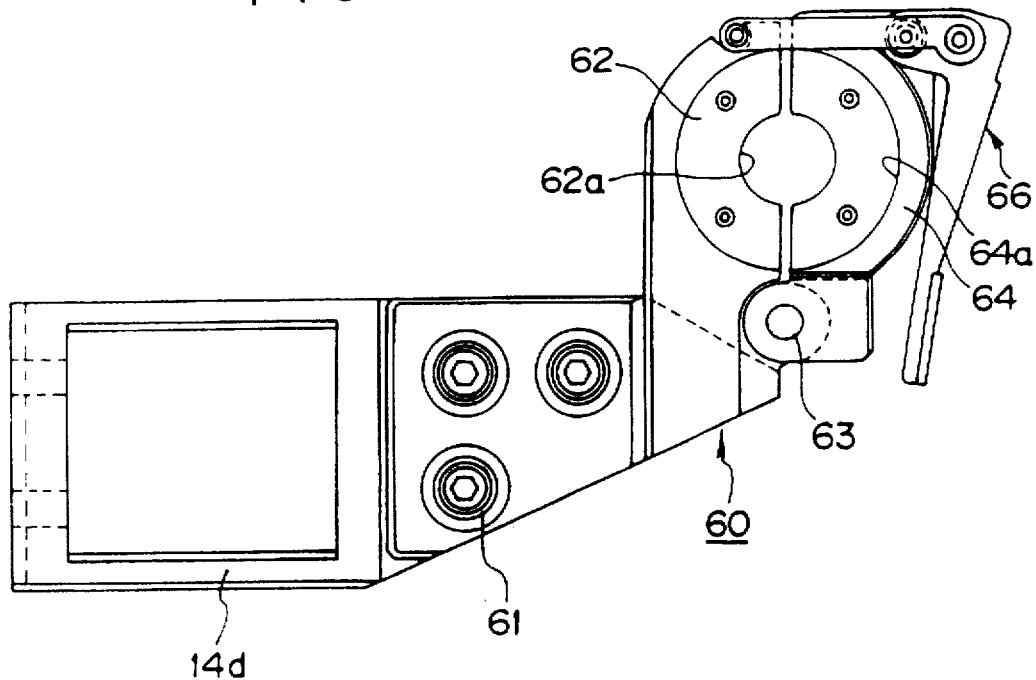
FIG. 18 is a front view showing the clamp unit shown in FIG. 17.

Referring now to FIGS. 17 and 18, there is shown a further embodiment of the automatic welding apparatus of the present invention. A pair of clamp units 60 which clamps the pipe 12 has the same structure as that of the pair of clamp units which clamps the pipe 12a. Therefore, a pair of clamp units will be described in detail.

By means of bolts 51, each clamp unit 60 is detachably and independently secured to a support arm 14d which is fixed to the body 14 or reciprocal thereto in a direction of an arrow X. The clamp unit 60 includes pipe bearing 62 which are provided in parallel to each other. Each pipe bearing 62 has a half-arcuate bearing face 62a on which the outer periphery of the pipe 12, 12a is borne. A clamp member 64 is pivotally mounted on the pipe bearing 52 via a hinge shaft 63. A half-arcuate holding face 64a is provided on the face of the clamp member 64 opposite to the pipe bearing 62. The pipe 12, 12a is held on the entire outer periphery thereof by the half-arcuate bearing face 62a and the half-arcuate holding face 64a. The pipe bearing 62 and the clamp member 64 are fastened by a fastening member 66.

In the present embodiment, there is provided an advantage in that the pipe 12, 12a can be clamped by removing one of the pair clamp units 60 which are parallel provided from the support arm 14d if the pipe is a different shaped pipe such as bent pipe or a pipe to which a valve is connected.

Referring now to FIGS. 1 to 4, an abut portion 24 is disposed on a rotary disc 30. Each end face of a pair of the pipes 12, 12a is abutted to the abut portion 24 when the pipes 12, 12a are clamped by the clamp units 10. This assures a predetermined space between the pipes 12, 12a.

The cutting unit 26 is disposed on the rotary disc 30. The cutting unit 26 is provided with a special cutter 26a for cutting the opposing end faces of the pair of pipes 12, 12a which are clamped by the pair of clamp units 10. The special cutter 26a is rotated by a motor 28.

When the opposing end faces of the pipes 12, 12a are cut, firstly the other clamp unit 10 (movable clamp unit) is rectlinearly moved toward the special cutter 26a of the cutting unit 26 and the end face of one of the pipes 12a is cut so that it is tapered from the inner wall thereof to the outer peripheral edge. The taper angle is in the range of for example 0.5 to 10°.

The taper angle of about 5° C. is optimal in view in that the projection of the end faces of the pipes 12, 12a in an inner direction at the welding portion is minimized.

The end faces of pipes may be cut at normal angles with respect to the axis thereof if needed. Alternatively, the end face may be cut to provide about 45 bevelled face at the inner or outer peripheral edge, or to provide semi-circular or semi-oval cross section face.

Then, the rotary disc 30 is rectlinearly moved toward one clamp unit 10 (fixed clamp unit) to cut the end face of the other pipe 12 from the outer periphery to the outer periphery for bevelling as similarly to the cutting of the other pipe 12a.

The abut portion 24 and the cutting unit 26 are disposed on the rotary disc 30 so that they are separated to each other at a predetermined distance. The cutting unit 26 is inserted between the pipes 12 and 12a after the abut portion 24 is removed from the space between the pipes 12 and 12a. Accordingly, miss alignment the abut portion 24 with the cutting unit 26 does not occur.

The angular movement from the abut portion 24 to the cutting unit 26 is accomplished by the rotation of the motor 32 which is linked via a well-known Geneva gear 31 mounted on a shaft 30a of the rotary disc 30.

Play which occurs when the end faces of the pipes 12, 12a by the cutting unit 26 is eliminated by means of the Geneva gear 31 in such a manner that stable formed face can be obtained.

Figure 3:
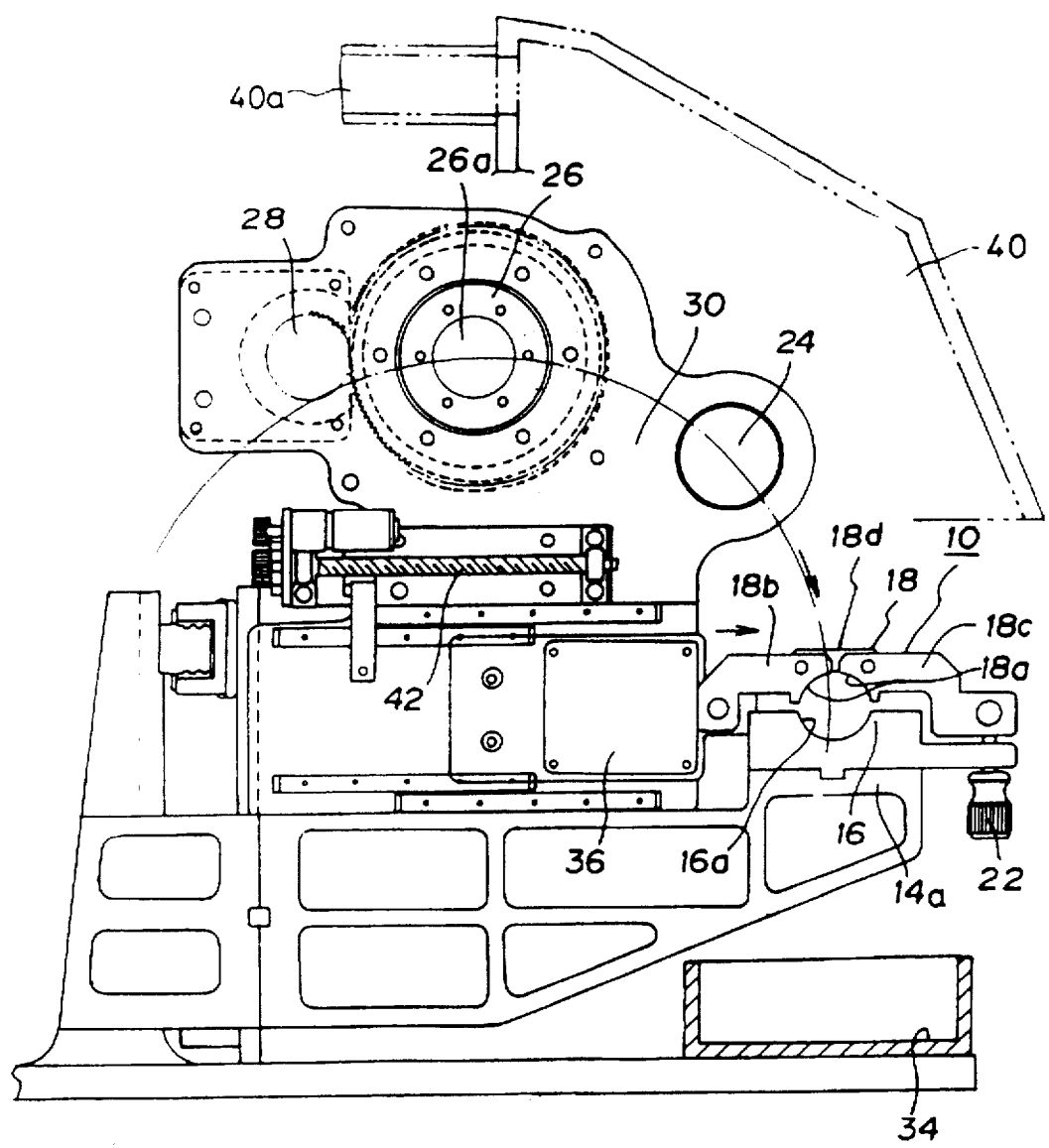
FIG. 3 is a left elevational view of the apparatus in Fig. 1.
Figure 4:
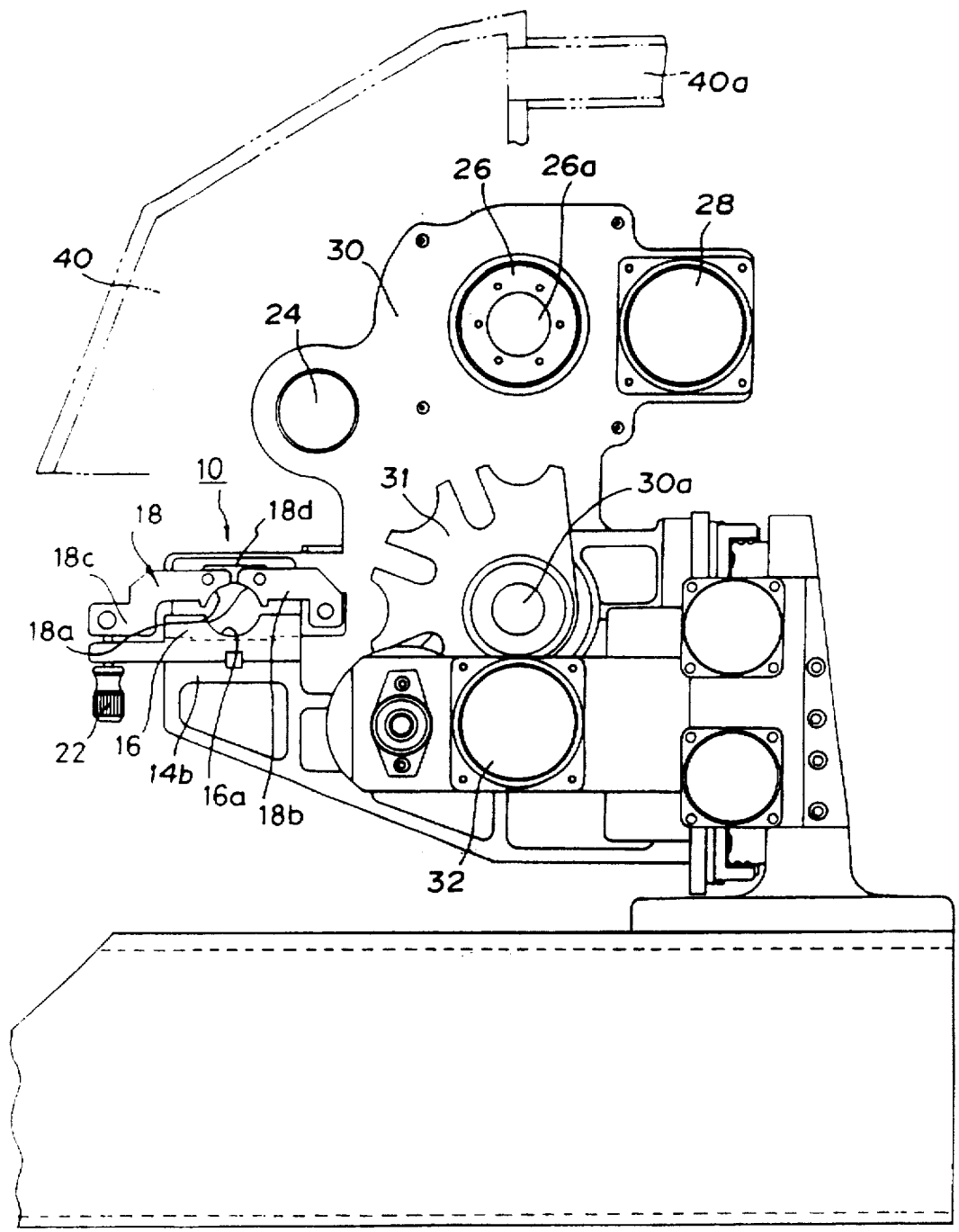
FIG. 4 is a right elevational view of the apparatus in FIG. 1.

A tray 34 for receiving cuttings generated due to cutting of the end faces is disposed below the cutting unit 26 as is best shown in FIG. 3. If the cotton-like cuttings are adhered to the pipes 12, 12a, washing of the cut end faces thereof would be necessary.

A fusing unit 36 is adapted to fuse the flat face which has been cut by the cutting unit 26 to a predetermined depth. The fusing unit 36 is disposed on the rotary disc 30 so that it is separated from the abut portion 24 and the cutting unit 26 at predetermined distances.

The fusing unit 36 may be various conventional well-known heating devices. The fusing unit 36 which is a third aspect of the present invention has a surface temperature lower than that of the conventional heating device, and therefore, has less energy consumption and shortened working period of time will be firstly described in detail.

In the illustrated preferred embodiment, the fusing unit 36 comprises first and second flat infrared ray transmittable glass plates 36c and 36d, an electrically heatable plate-like tungsten heating element 36a which is interposed between the glass plates; and thin ceramic layers 36e, 36f which are laminated on the outer faces of the glass plates 36c and 36d. The feature of the fusing unit 36 which is the third aspect of the present invention resides in that the ceramic layers 36e and 36f are made of a material which is capable of emitting at a high emissivity far infrared rays including rays falling in a wave length range in which the rays has a relatively high absorption rate in the absorption spectrum of the pipes 12, 12a made of a resin to be connected.

Raised portion 36b and a plurality of convex strips which are disposed to surround at least a plate-like tungsten heating element 36a of the glass plate. The infrared ray transmittable glass plates may be made of quartz glass, calcium aluminate, glass germanate, and arsenic sulfide glass. Since these glass plates may be supported on the plurality of convex strips 36e in the midpoint, the risk of damages such as breaking which may occurs on application of force upon the central area of the fusing unit 36 is reduced.

A thermal sensor 38 such as thermocouple is disposed in the midposition of the fusing unit 36. The temperature of the tungsten heater element 36a on fusing is controlled to an appropriate temperature which will be described below by the thermal sensor 38.

Now, preferred materials of the thin ceramic layers 36e and 36f laminated on the outer surfaces of the glass plate 36a and 36d will be described.

Figure 22:
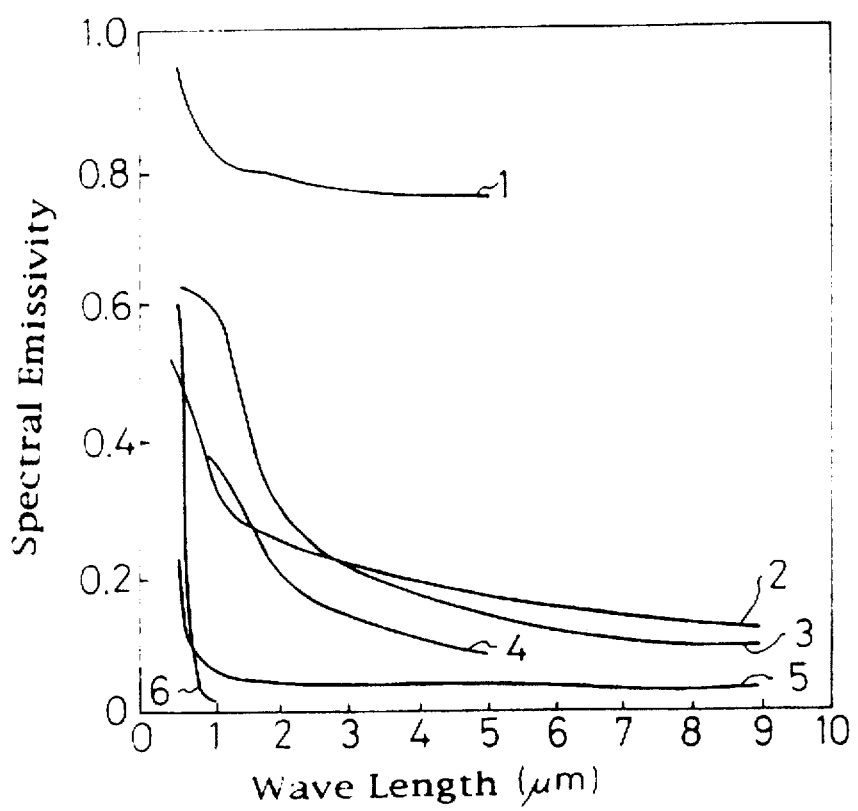
FIG. 22 ia a graph showing the relations between the wave length and the spectral emissivity established when typical metals are heated.
Figure 23:
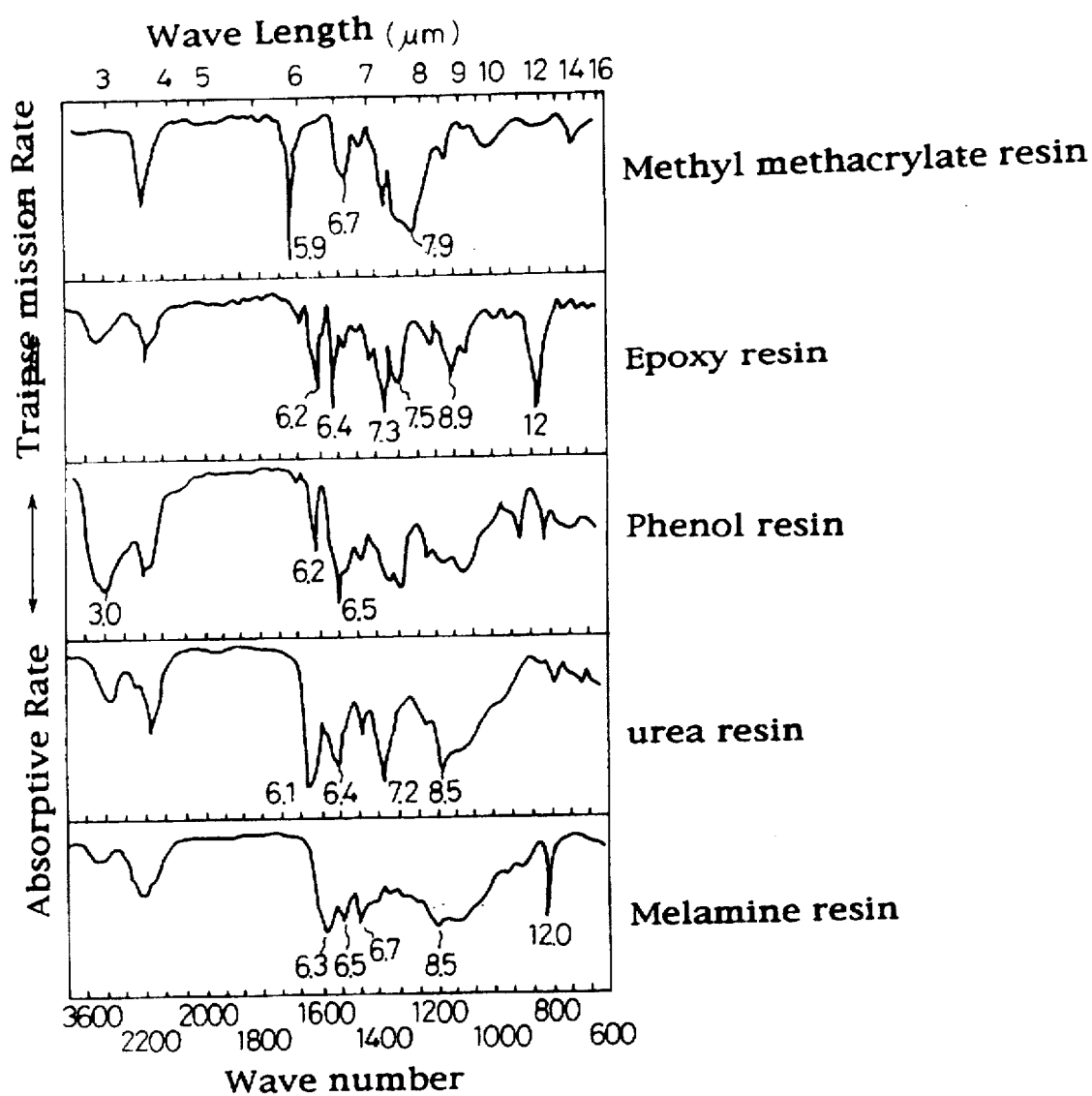
FIG. 23 is a graph showing the infrared absorption spectra of various resins.

FIG. 22 is a graph showing the relation between the wave length and spectral emissivity obtained when typical metals are heated. FIG. 23 is a graph showing the infrared ray absorption spectra of various resins.

As shown in FIG. 22, the metal has an emissivity in order of about 0.4 to 0.6 in the near infrared ray range less than 2 μm while it has an emissivity of not higher than 0.3 in the far infrared may range not less than 2 μm. Observation of the infrared ray absorption spectra of various resins as illustrated in FIG. 23 shows that high molecular materials such as resin have an absorption rate which is higher for the far infrared rays having wave length not less than 6 m and which is remarkably lower for near infrared rays. This is the reason why higher temperature and an extended period of time is required for heating a resin with a nickel-chrome (Ni-Cr) heater or iron, chromium, aluminium (Fe-Cr-Al) heater. Accordingly, a great amount of energy is required for heating. The present invention was made based upon finding that the end faces of the pipes of resin can be fused at lower temperatures within an shortened period time by selecting as a radiator a material which is capable of emitting at a higher emissivity far infrared rays including rays falling in a wave length range in which absorption rate is relatively higher among the absorption spectra of the pipes of resin to be connected to each other.

Fluorine resins such as PTFE, FEP, PFA, ETFE, CTFE, PVDF and high grade engineering plastic resins such as PPS which have been popularity used in pharmaceutical, food, semiconductor, biotechnological and chemical industries in recent years also have absorption spectra in which the absorption rate is higher in the far infrared ray range. Accordingly, it is preferable to use a radiator which is capable of radiating such far infrared rays at a higher rate.

Figure 24:
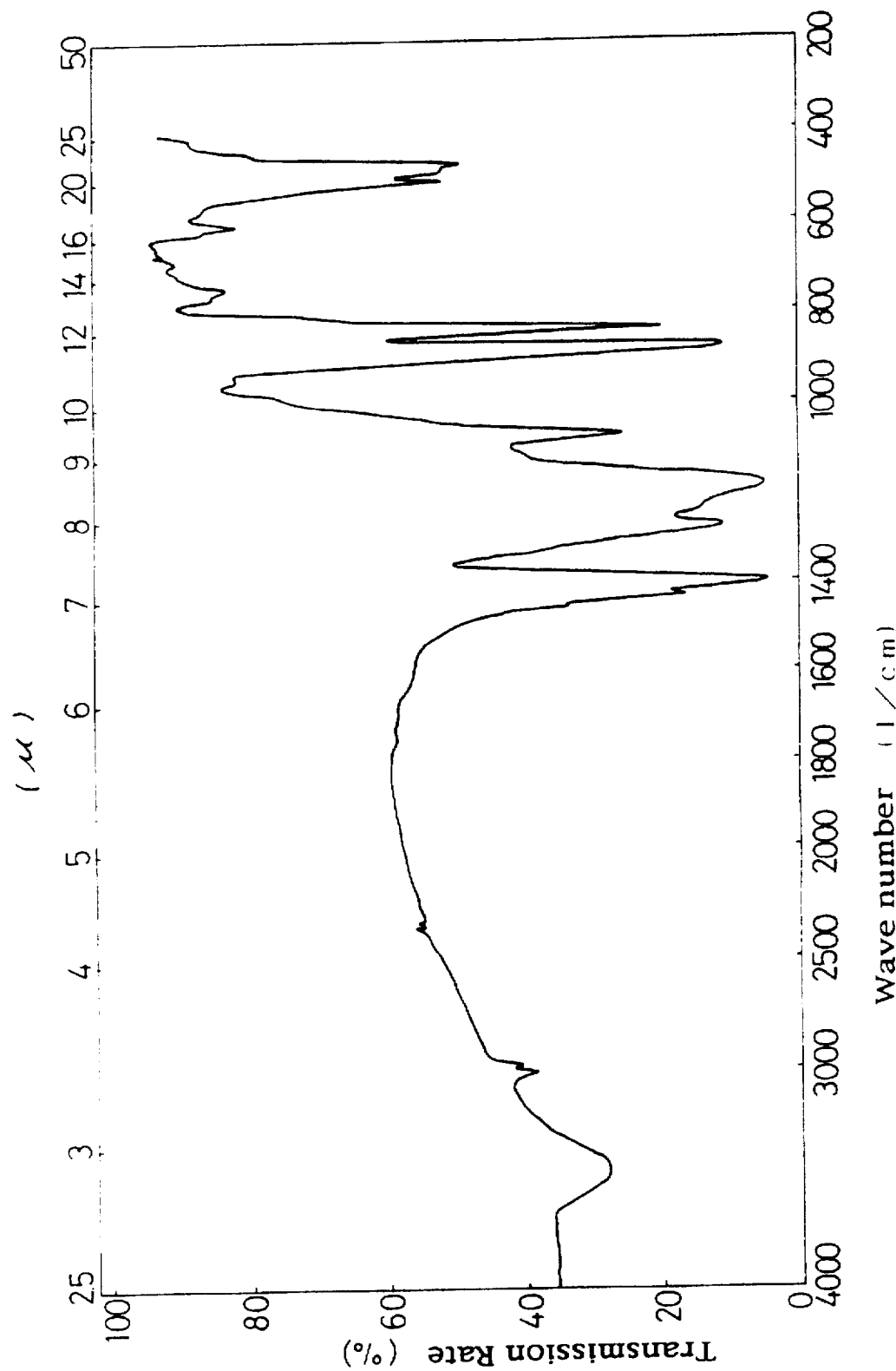
FIG. 24 is a graph showing the absorption spectrum of PVDF.
Figure 25:
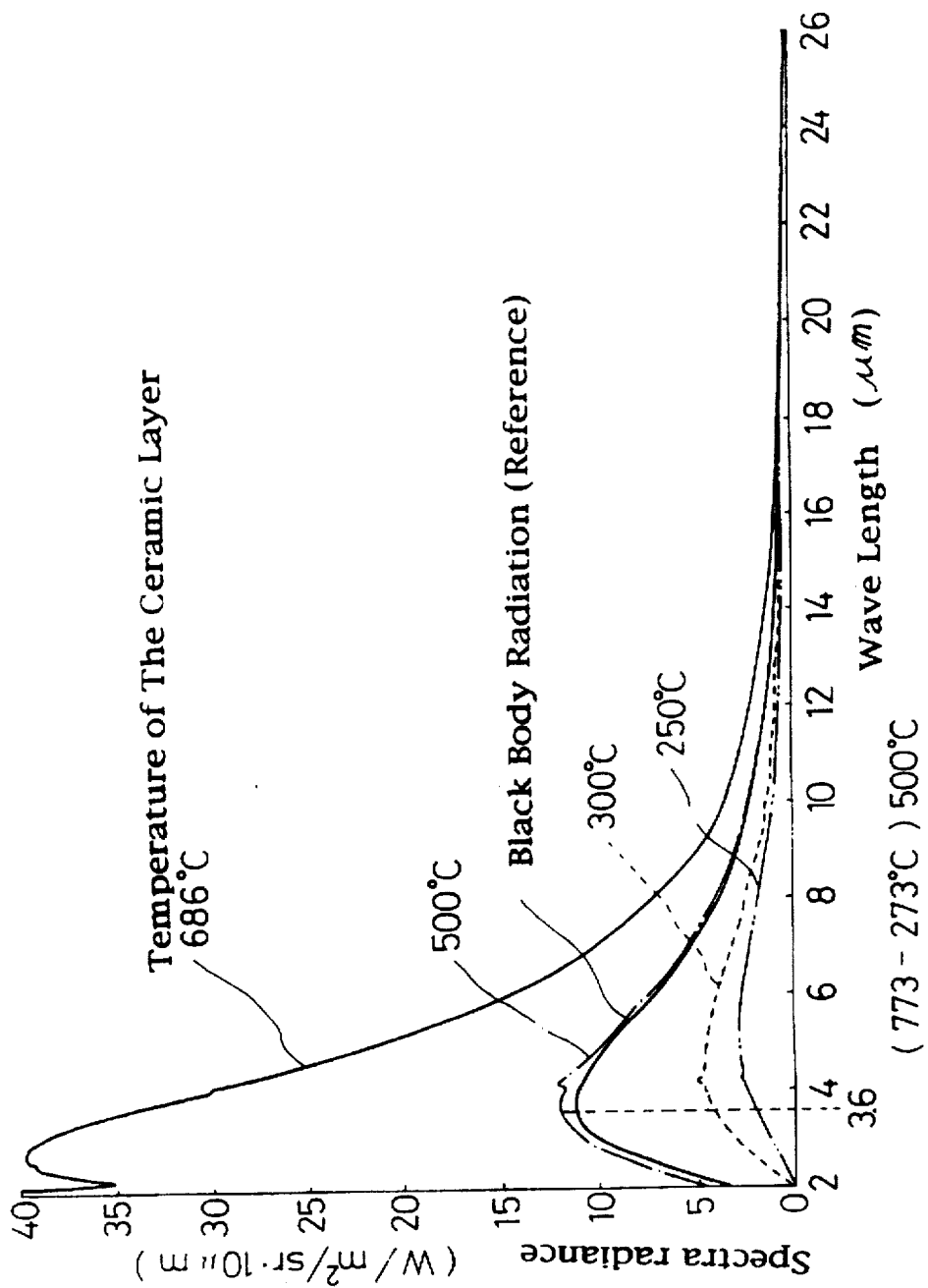
FIG. 25 is a graph showing the infrared spectral radiation.

Referring now to FIG. 24, there is shown the absorption spectrum of PVDF. It is found from this drawing that the absorption rate of the far infrared rays is not less than 0.5 in the wave length range of 6 to 10 μm. FIG. 25 shows the infrared spectral radiation output when CERASTATS BRA (tradename: commercially available from Shima Boeki K. K., Chuo-ku, Osaka, Japan and produced by Parkar K. K. Higasi-ku, Osaka, Japan) is used as the material for the ceramic layers 36e, 36f. The CERASTATS BHA is estimated to have a higher emissive in a far infrared may range at each tested temperature. A black body furnace of 500° C. which is a reference value was used. The infrared ray spectral radiation outputs were measured by means of a Fourier transformation infrared ray spectrometer (FTIR) in respective cases where the temperatures on the surfaces of the ceramic layers 36e and 36f were 686° C., 600° C., 300° C. and 250° C.

Figure 26:
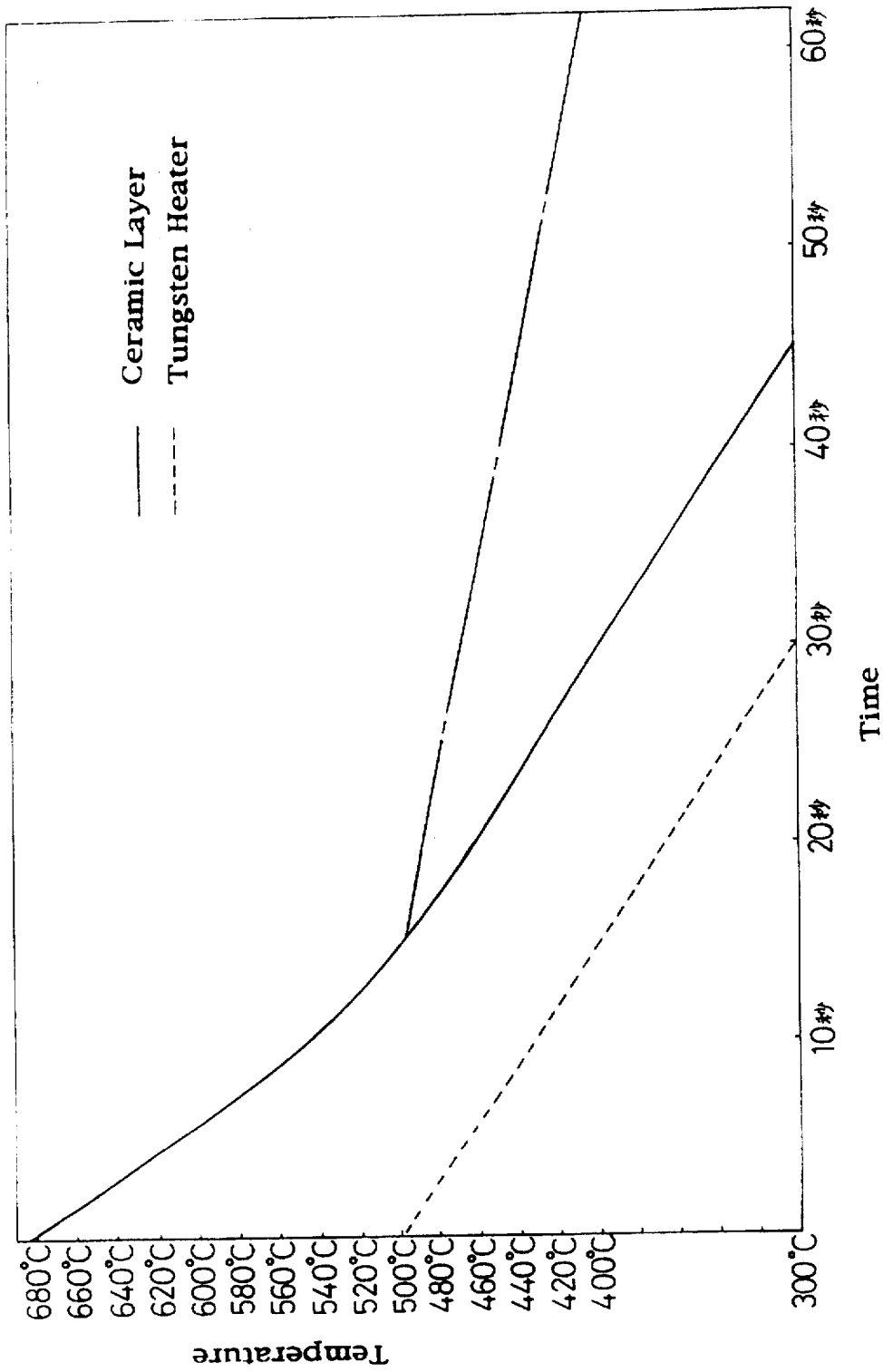
FIG. 26 is a graph showing the relation between the temperature of the surface of the ceramic layer of the heating unit and the temperature of a tungsten heater.

FIG. 26 shows the correlation between the temperature on the surfaces of the ceramic layers 36e, 36f (solid line) and the temperature of the tungsten heater 36a (dotted line). The actual measurements on which the drawing is based are as follows: The temperatures of the tungsten heater 36a (which were measured by a sensor disposed in the heater) were 500° C., 400° C., 297° C., 221° C. and 192° C. where the temperatures on the surfaces of the ceramic layers 36e, 36f were 686° C., 500° C., 400° C., 300°C. and 250° C., respectively.

It is apparent from FIG. 25 that the absolute value of the energy which is radiated is not so high in the wave length range of 6 μm and higher when the temperature on the surface of the ceramic layers 36e, 36f is not higher than 500° C. If a body to be heated has a high absorption rate in such a wave length range when the emissivity of the far infrared ray radiator is low, for example, not higher than 0.5 in such a wave length range, the radiated far infrared rays would not be efficiently converted into thermal energy. Conversely, if materials including materials such as CERASTATS BHA having a higher emissivity in a full far infrared ray range and a process which makes the emissivity of the far infrared ray radiator higher in such a wave length range is adopted, it would be possible to heat the body at low surface temperatures for a shortened period of time. It is found from the above-mentioned measurements that the surface temperatures of the ceramic layers 36e, 36f are preferably 250° C. to 580° C., more preferably about 500° C. (the wave length exibiting the highest emissivity is 6 μm) since the ceramic layers have an enough emissivity in the range of 6 to 10 μm.

The PVDF shown in FIG. 24 has a wave length range of 6 to 10 μm in which the absorption rate is not less than 0.5. Accordingly, it is possible to efficiently and quickly heat the pipes made of PVDF by using as a radiator a material having a high emissivity in this wave length range.

Figure 27:
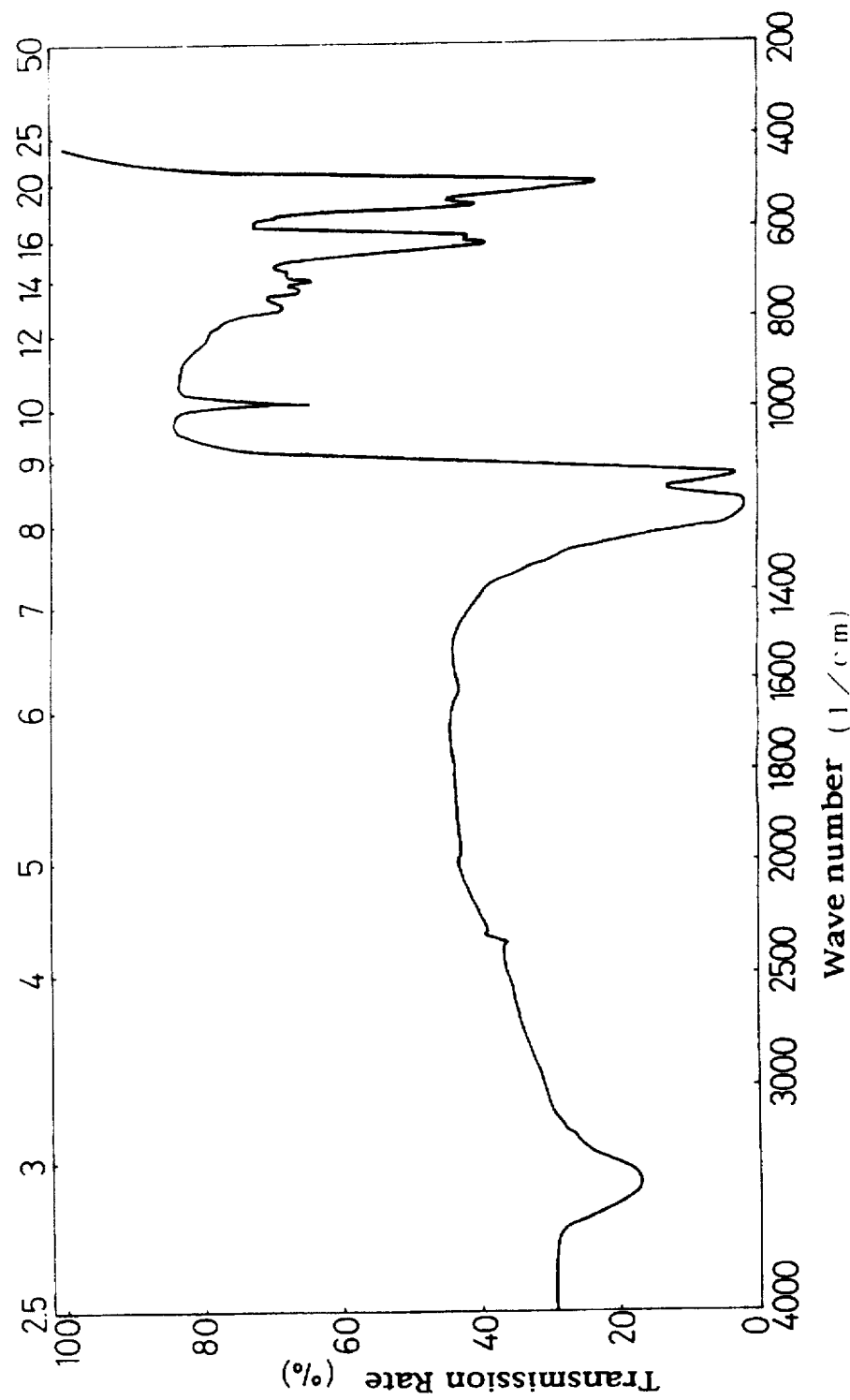
FIG. 27 is a graph showing the absorption spectrum of PFA.

FIG. 27 shows the absorption spectrum view of PFA. It is also found from this drawing that the absorption rate of the far infrared ray is not less than 0.5 in the wave length range of 6 to 10 μm similarly to the case of PVDF. Accordingly, it is possible to efficiently and quickly heat the pipes made of PFA by using as a radiator a material having a high emissivity in this wave length range.

Figure 28:
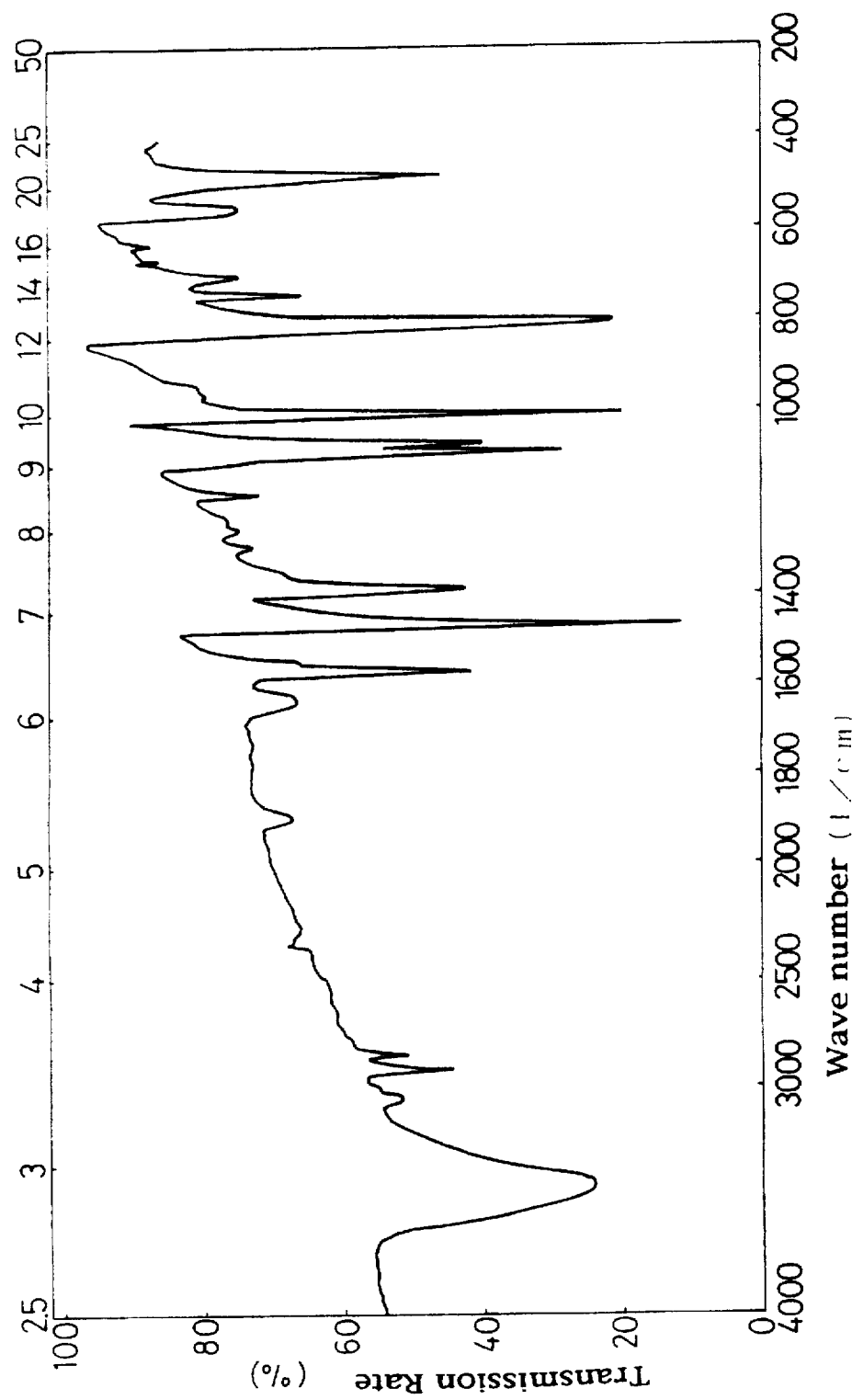
FIG. 28 is a graph showing the absorption spectrum of PPS.

FIG. 28 shows the absorption spectrum view of PPS. It is also found from this drawing that the absorption rate of the far infrared ray is not less than 0.5 in the wave length range of 2.5 to 3.5 μm and 6 to 13 μm. Accordingly, it is possible to efficiently and quickly heat pipes made of PPS by using as a radiator a material having a high emissivity in this wave length range.

It is apparent from the above-mentioned description that it is possible to efficiently conduct heating by using as a radiator a material having a high emissivity in a wave length range in which a body to be heated has a high absorption rate. For example, PFA and PVDF have wave length ranges of 6.8 to 9.2 μm and 7.2 to 8.8 μm respectively in which the emissivity is not less than 0.6. Accordingly, by using as a radiator a material having a particularly high emissivity in such a wave length range, it is possible to efficiently and quickly heat these materials.

Table 1 shows the changes in temperature with the lapse of time at the end face of a pipe made of PFA, PVDF and PPS in case where the above-mentioned CERASTATS BHA is adopted as the material for the ceramic layers 36e, 36f and its surface temperature is 500° C.

TABLE 1

|  | PAF | PVDF | PPS |
| --- | --- | --- | --- |
| after 15 sec. | 497 | 497 | 495 |
| after 30 sec. | 470 | 472 | 489 |
| after 45 sec. | 440 | 441 | 480 |
| after 60 sec. | 441 | 412 | 470 |

(unit: °C.)

As is apparent from Table 1, the temperature is slowly lowered at the end face of the pipe in every case. This is because the heating device continues to radiate the far infrared rays even after turning off of a power source. Fusing continues inwards from the end face of the pipe so that the pipe can be fused to a given depth.

Since the ceramics has generally a high emissivity in the far infrared ray range and an excellent heat resistance, it is widely used as a far infrared ray radiator.

However, the infrared ray radiating or emission characteristics of the ceramics are closely correlated with the electron arrangements and resistivities of the constitutional metal elements and largely differ depending upon the manner of working and compounding of the materials.

Figure 29:
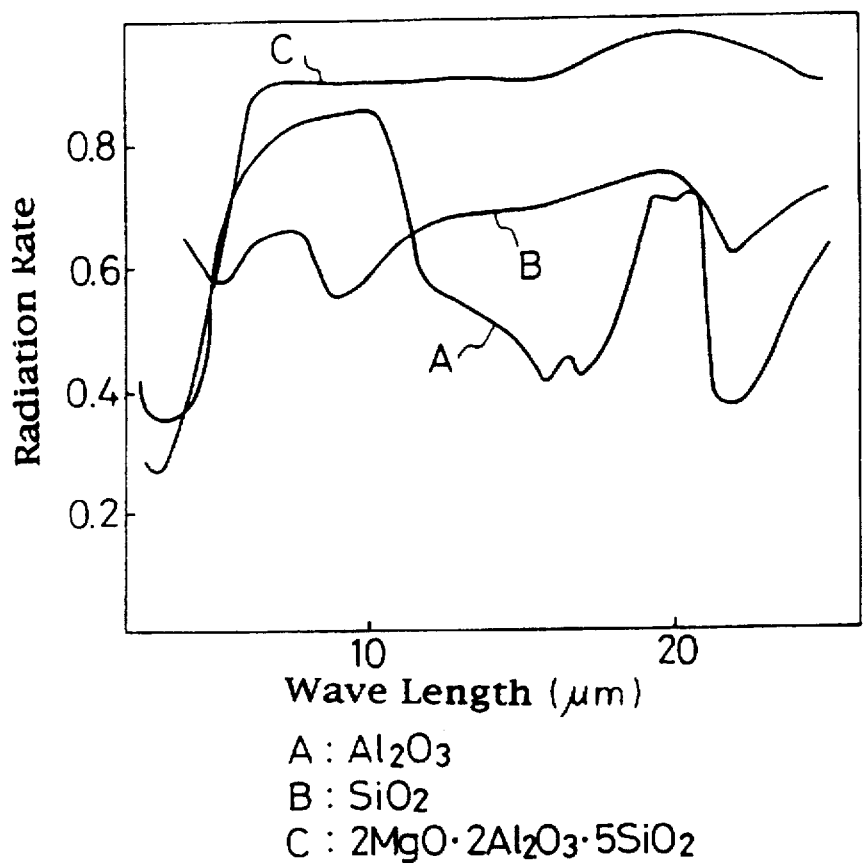
FIG. 29 is a graph showing the spectral emissivity of metal oxide ceramics belonging to II–IV group of periodic table.
Figure 30:
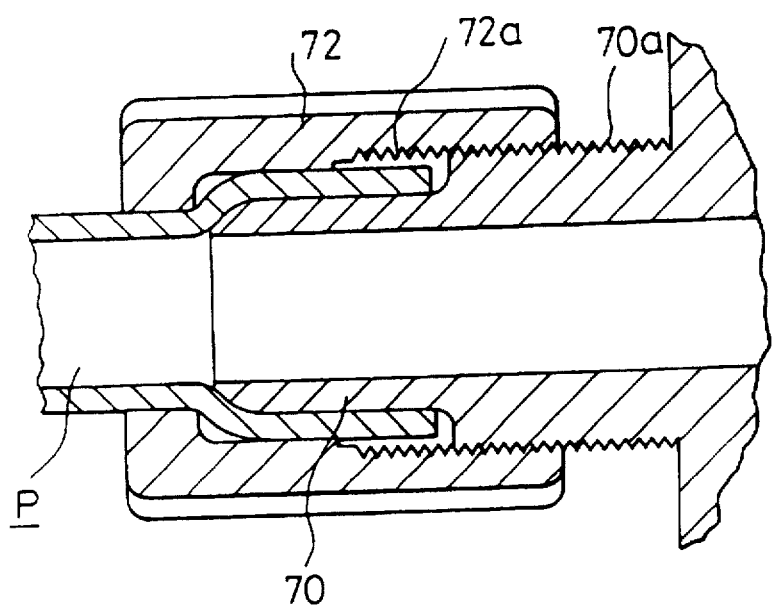
FIG. 30 is a longitudinal sectional view illustrating the method of connection of the piping materials using conventional flaring working.

FIG. 29 shows the spectral emissivity of the metal oxide ceramics belonging to II–IV group of the Periodic Table. As shown in FIG. 29, for example, alumina ($Al_2O_3$) has an emissivity which is not necessarily high in the far infrared ray range of 10 to 20 μm and thus is not suitable for the pipes made of resin to be connected, having a wave length range of 10–20 μm in which the emissivity is relatively high.

The composite materials including several materials generally often exhibit a combination of the properties of constitutional materials. There is a similar tendency in the infrared radiation characteristics. Based on this tendency, it is possible to select an optimal material which radiates the infrared rays in a wave length range in which the absorption rate is relatively high in the absorption spectrum of the resin pipes to be connected.

The ceramic layers 36e and 36f in the heating device, that is, the fusing unit are not in contact with the end faces of the pipes 2, 4 to be cut and it is preferable to space them at a distance of about 1 to 10 mm, more preferable 1.5 to 2.5 mm. If the space is too narrow, there is the risk that the end faces may be brought into contact with the fusing unit 36 due to expansion of the pipes 2, 4 on heating. Conversely, if the space is too wide, it would be necessary to elevate the temperature of the fusing unit 30. The end faces of the pipes 12, 12a are uniformly fused by the radiation of the stable far infrared rays within about 5 to 150 seconds.

In such a manner, the heating unit which is a third aspect of the present invention has a feature in that it does not directly heat the end faces of the resin pipes to be connected, but fuses the end faces by a radiator which is not in contact with the end face and radiates at a high emissivity the infrared rays in a range including rays falling in the wave length range in which the absorption rate is relatively high among the absorption spectrum of the resin pipes to be connected.

Since the resin pipes are heated with the far infrared rays falling in the wave length range in which the absorption rate is high, they have an advantage in that they may be fused within a shortened period of time even if the temperature of the radiator is lower in comparison with that of the conventional heating apparatus. Therefore, a small amount of energy may be required to fuse the end faces of the resin pipes.

The radiator continues to radiate given far infrared rays even when the heater does not continue to heat the radiator, if the radiator has reached to a given temperature once as shown in Table 1. Accordingly, it is possible to stop heating of the heater while the end faces of the resin pipes to be connected is heated to fuse after the heater has preliminarily been heated. This more saves the energy required to fuse the end faces of the resin pipes and shortens the period of time which is taken to fuse the end faces.

If the fusing unit 36 is driven to move in a plane normal to the axis of the heated pipes 12, 12a therebetween, variations in fusing depth at the end faces of the pair pipes are eliminated so that the pipes can be fused to substantially uniform depth.

Now, a fusing unit which is a fourth aspect of the present invention which can be used as the fusing unit 36 will be described in detail.

Figure 12:
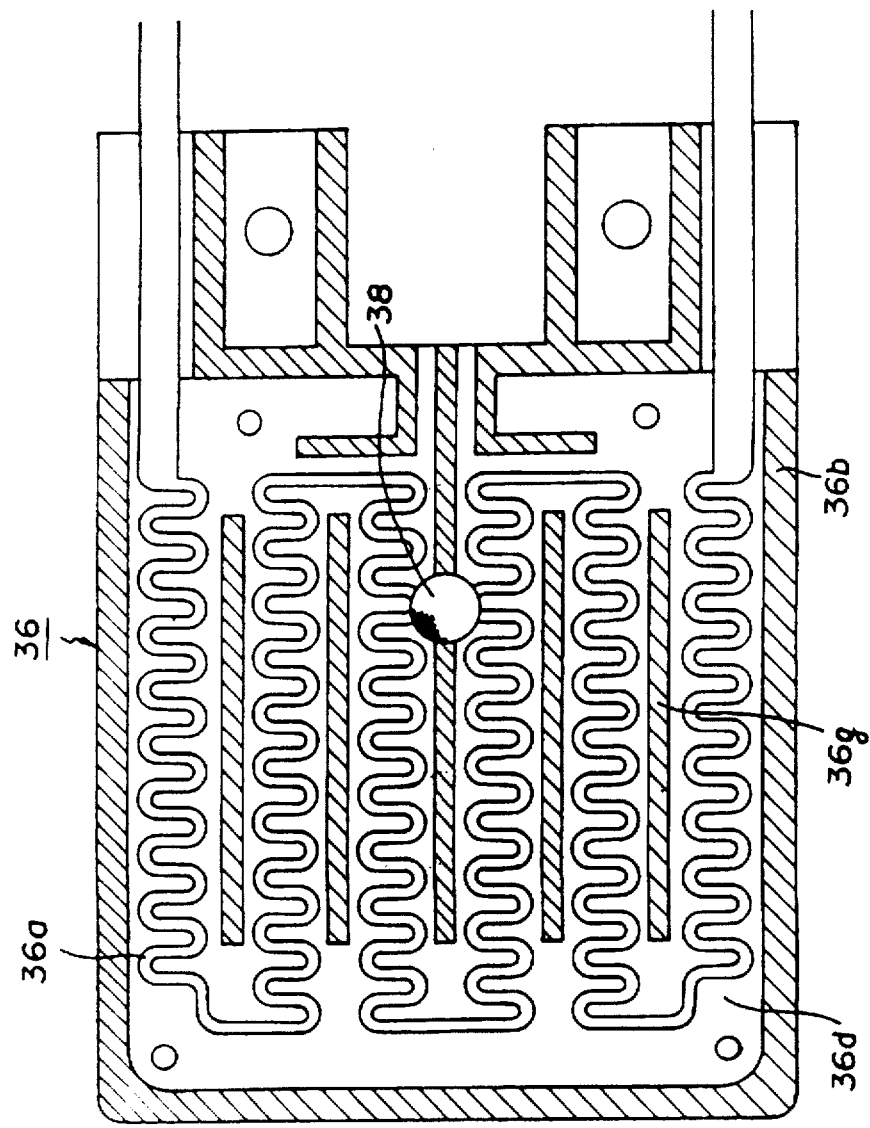
FIG. 12 is a plan view showing a heating unit having a radiator made of a material which is capable of radiating given far infrared rays at a high emissivity.
Figure 13:
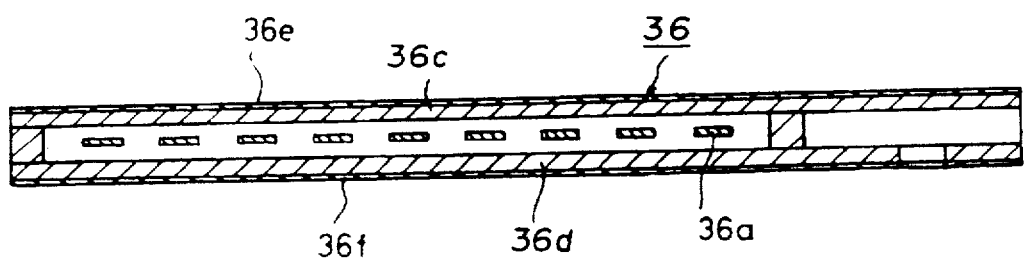
FIG. 13 is a longitudinal sectional view showing the heating unit of FIG. 12.
Figure 21:
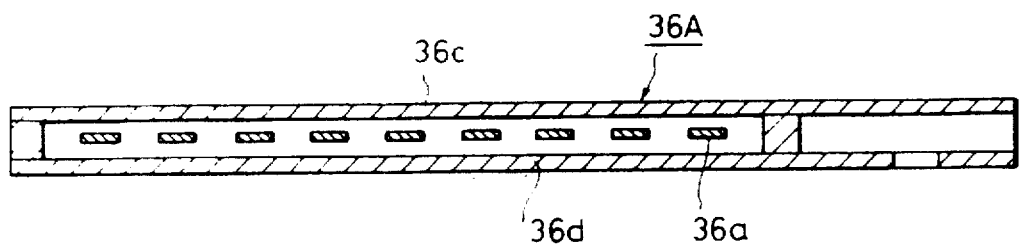
FIG. 21 is a longitudinal sectional view showing the heating unit which is used for the automatic welding apparatus shown in FIG. 1.

A fusing unit 36A of which is the fourth aspect of the present invention shown in FIG. 21 is identical in structure with the fusing unit 36 of the third aspect of the present invention shown in FIGS. 12 and 13 except that the ceramic layers 36e and 36f are not laminated on the outer faces of the glass plates 36c and 36d, respectively.

After the fusing unit 36A has been heated to a given temperature in comparison with that of the fusing unit 36, it is inserted into a space between pair pipes 12, 12a (the space will be hereinafter referred to as "heating position") which are clamped by a pair of clamp units 10. The time required for heating is about 45 seconds in case of PFA. After the fusing unit 36A is heated to about 600° to 800° C., preferably 700° to 750° C., it is moved to the heating position by the rectilinear moving mechanism 42 ass shown in FIG. 11 to heat the end faces of the pipes 12, 12a for a given period of time.

The rectilinear moving mechanism 42 may include various mechanisms such as mechanism using a ball bearing screw mechanism, and actuator using a pneumatic cylinder. The mechanism for moving and removing the fusing unit 36A to and from the heating position may include various mechanisms such as rotary reciprocating mechanism, as well as the illustrated rectilinear reciprocating mechanism.

The outer faces of the glass plates 36c and 36d in the fusing unit 36A are not in contact with the cut end faces of the pipes. It is preferable to provide the spacing of about 1 to 10 mm, more preferably 1.5 to 2.5 mm. The fusing period of time is about 70 seconds and the end faces of the pipes 12, 12a are uniformly fused with stable radiated heat.

In the preferred embodiment, means for scattering thermal rays may be provided on the surface of the glass plates 36c and 36d in lieu of the ceramic layers 36e and 36f shown in FIG. 13. This enables the end faces of the pipes 12, 12a to be uniformly heated independently of the arrangement of the plate-like tungsten heater elements 36a. Accordingly, the pipes 12, 12a can be fused from their end faces to equal depths. This can remarkably reduce the formation of bubbles (voids) in the welding portions.

Means for scattering thermal rays may be provided by roughing the glass surface like ground glass or by providing grooves longitudinally and laterally or at random. The roughed glass which is produced by applying a dissolving agent which is capable of dissolving the glass, such as "Aronceramic" tradename, commercially available from Toa Gosei Kagaku Kogyo K. K. on the glass surface after being cured with heat is excellent in particular scattering ability since the etched cross sections are irregular. A filter which is similarly treated may be adhered to the surfaces of the glass plates 36c and 36d. In such a manner, the fusing unit which is the fourth aspect of the present invention can be made thin. The end face of a pair of the fusible pipes of resin can be uniformly fused with stable radiation heat. A pair of fusible resin pipes can be automatically welded within a short period of time, therefore, there is an advantage in that electric power consumption can be reduced.

After the pipes 12, 12a are fused from their end faces to a given depth by means of the above-mentioned fusing unit 36 or 36A, the fusing unit 36 or 36A is removed from the heating position.

Thereafter, one of the pipes 12a is moved toward the other pipe 12 which is fused by the fusing unit 36 or 36A for welding the pipes 12 and 12a to each other.

The gas which is generated on fusing is sucked via an air collecting duct 40a which is linked to the rear and upper portion of a hood 40 disposed above the apparatus.

Now, the principle of operation of the apparatus for automatically welding pipes of fusible resin of the present invention will be described with reference to drawings.

A rectangular pipe bearing 16 having a size adapted to the diameter of pipes 12, 12a to be welded to each other is prepared and is fixed on the apparatus body 14.

The pipes 12, 12a to be welded which form a pair are placed on the pipe bearing 16. When a power source for the apparatus is turned on, a light of the power source is lit.

When the size and material 12, 12a is set with a select switch, a select switch (not shown) is lit.

When a preparation button is depressed after the lighting select lamp is confirmed, the preparation button lamp is lit and the motor 32 starts to rotate. Rotation of the motor 32 causes the Geneva gear 31 to be rotated so that the abut portion 24 is inserted and stops between the pipes 12, 12a.

The pipes 12 and 12a are moved so that their face ends abut on the abut portion 24 in a normal angle to the axis of the pipes and the pipe 12, 12a are appropriately clamped by the clamp units 10.

Figure 14:
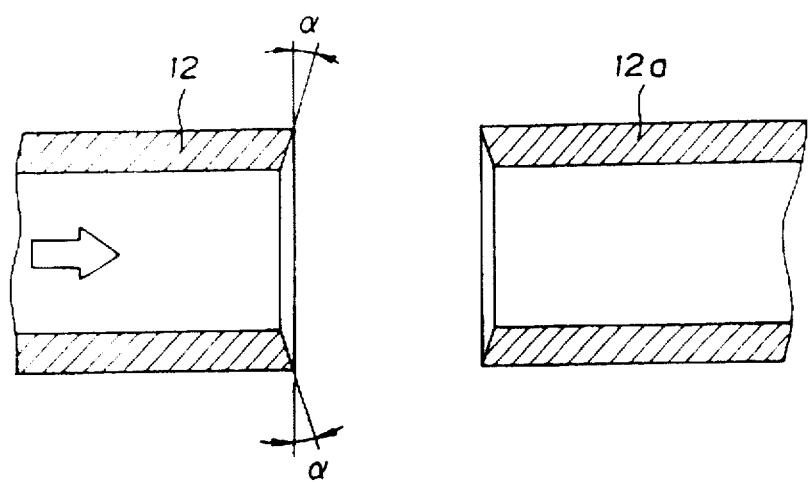
FIG. 14 is a longitudinal sectional view showing a pair of pipes made of a thermally fusible resin which are welded to each other while they are opposed and abutted to each other.

When the start button is depressed, the preparation button lamp is turned off and the start button lamp is lit and the motor 32 is rotated. The rotation of the motor 32 causes the Geneva gear 31 to rotate. The cutting unit 26 disposed on the rotary disc 30 which is rotated by the rotation of the Geneva gear 31 is inserted into a space between the pipes 12 and 12a and stops there. The cutting unit 26 cuts the end edge of the other pipe 12a which is clamped by the other clamp unit 10 so that the end face is bevelled with the special cutter 26a (refer to FIG. 14).

Subsequently, the special cutter 26a is moved toward the end edge of one of the pipes 12 which is clamped by one of the clamp units 10 for cutting the end edge of the pipe 12 for bevelling.

After cutting of the end edges of the pipes 12, 12a for bevelling is completed, rotation of the special cutter 26a is stopped. The end edges of the pipes 12, 12a can be cut simultaneously.

Then, the support arm 14b is moved with respect to the apparatus body 14 to separate the clamp units 10 disposed on the support arms 14a and 14b at a given distance.

Rotation of the motor 32 rotates the Geneva gear 31. The fusing unit 36 disposed on the rotary disc 30 which is rotated by the rotation of the Geneva gear 31 is set to an original position as shown in FIG. 3 and the plate-like tungsten heater element 36a starts preliminary heating.

After confirmation of the completion of the preliminary heating, the fusing unit 36 is inserted into a space between the pipes 12 and 12a by the rectilinear moving mechanism 42 for heating them for a given period of time.

As mentioned above, the temperature of the fusing unit 36 including the ceramic layers 36e, 36f shown in FIGS. 12 and 13 is set to 250° to 580° C. and the temperature of the fusing unit 36A shown in FIG. 21 is set to 600° to 800° C., preferably 700° to 750° C. The heating time and temperature can be preliminarily set depending upon the material and size of the pipes 12, 12a.

Figure 20:
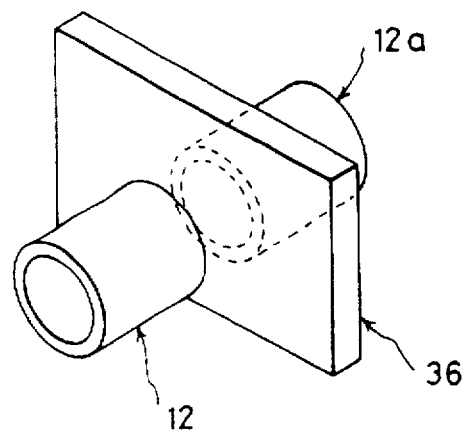
FIGS. 20(a), (b) and (c) are schematic perspective views showing the steps after resin pipes are fused by means of fusing unit of the present invention, that is, the heating unit.
Figure 20:
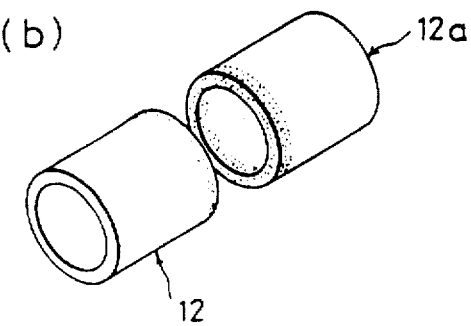
Figure 20:
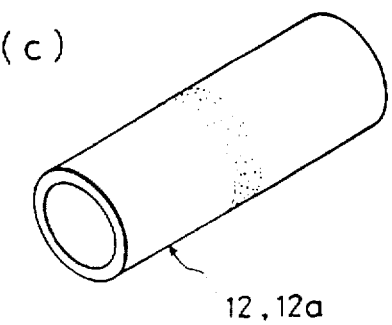

Referring now to FIGS. 20(a) to 20(c), there is shown a schematic perspective view showing the steps of welding the pipes after the resin pipes are fused with the fusing unit of the present invention, that is, heating device.

The fusing unit 36 which is the third aspect of the present invention is inserted into a space between the pipes 12 and 12a as shown in FIG. 20(a) for heating the pipes 12, 12a from the end faces to a given depth. Thereafter, the fusing unit 36 is removed from the heating position to the original position by the rectilinear moving mechanism 42 as shown in FIG. 20(b) and the pipes 12 and 12a are moved toward to abut each other for connection as shown in FIG. 20(c).

The fusing unit 26 can be preliminarily heated to a given temperature prior to insertion to the heating position between the pipes 12 and 12a and the power supply from the power source can be stopped when the fusing unit 36 is moved to the heating position.

After the fusing unit has been cooled, a welding completion button lamp is lit and the start button lamp is turned off.

When the pair of welded pipes 12 and 12a is removed from the clamp units 10 and the welding completion button is depressed, the welding completion button is turned off and the Geneva gear 31 and the abut portion 24, cutting unit 26 and the fusing unit 36 which are disposed on the rotary disc 30 are returned to their original positions.

The automatic welding apparatus which is the first aspect the present invention is capable of conducting all steps for automatic welding in a continuous and smooth manner and never requires any sophisticated experience.

What is claimed is:

1. An apparatus for automatically welding a pair of tubular components made of a thermally fusible resin by abutting them to each other, comprising:
   a pair of clamp units each for holding a respective one of the pair of tubular components;
   an abut portion on which an end face of each of the tubular components is abutted while the pair of tubular components are held by the pair of clamp units;
   a cutting unit for cutting the respective end faces of the pair of tubular components which are held by the pair of clamp units, after said abut portion has been removed to leave the end faces opposing to each other separated by a space;
   a fusing unit for fusing the opposing end faces of the tubular components, which have been cut by the cutting unit, to an equal fusing depth;
   a rotary disc on which said cutting unit, said abut portion, and said fusing unit are spacedly disposed for movement in an angular moving direction, said rotary disc being driven so as to move said abut, cutting, and fusing units in turn in the space between the end faces of the tubular components; and
   one of the tubular components with its end face fused by the fusing unit being thereupon moved toward the end face of the other of the tubular components fused by the fusing unit for welding the fused end faces of the tubular components to each other.

2. An apparatus for automatically welding tubular components made of a thermally fusible resin as defined in claim 1 in which said cutting unit is arranged to cut the respective end faces of the pair of the tubular components so that the end faces are tapered from an inner wall to an outer peripheral edge in cross section of the respective tubular components.

3. An apparatus for automatically welding tubular components made of a thermally fusible resin as defined in claim 1 in which said fusing unit comprises a radiator made of a material which is capable of radiating at a high emissivity far infrared rays including those falling in a range of wave length in which the absorption rate is higher among the absorption spectrum of the tubular components to be connected and a heater for heating said radiator to radiate predetermined far infrared rays therefrom.

4. An apparatus for automatically welding tubular components made of a thermally fusible resin as defined in claim 3 in which said fusing unit is adapted to be preliminarily heated to a given temperature prior to being inserted into the space between end faces of the tubular components.

5. An apparatus for automatically welding tubular components made of a thermally fusible resin as defined in claim 1 in which said fusing unit comprises a pair of glass plates through which infrared rays are transmittable and a heater element which is sandwiched between the glass plates.

6. An apparatus for automatically welding tubular components made of a thermally fusible resin as defined in claim 1 in which said fusing unit on said rotary disc is driven to move in a plane normal to an axis of alignment of the tubular components into the space between the end faces during heating, whereby the tubular components are fused from their end faces to an equal depth.

7. An apparatus for automatically welding tubular components made of a thermally fusible resin as defined in claim 1 in which each of the clamp units is adapted to secure a respective tubular component in two positions.

* * * * *